US011227368B2

United States Patent
Sun

(10) Patent No.: US 11,227,368 B2
(45) Date of Patent: Jan. 18, 2022

(54) METHOD AND DEVICE FOR CONTROLLING AN ELECTRONIC DEVICE BASED ON DETERMINING A PORTRAIT REGION USING A FACE REGION DETECTION AND DEPTH INFORMATION OF THE FACE REGION DETECTED

(71) Applicant: Guangdong Oppo Mobile Telecommunications Corp., Ltd., Guangdong (CN)

(72) Inventor: Jianbo Sun, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 46 days.

(21) Appl. No.: 16/564,990

(22) Filed: Sep. 9, 2019

(65) Prior Publication Data

US 2019/0392564 A1 Dec. 26, 2019

Related U.S. Application Data

(63) Continuation of application No. PCT/CN2017/076028, filed on Mar. 9, 2017.

(51) Int. Cl.
*G06T 5/00* (2006.01)
*G06T 7/12* (2017.01)
(Continued)

(52) U.S. Cl.
CPC .......... *G06T 5/009* (2013.01); *G06K 9/00234* (2013.01); *G06K 9/00241* (2013.01);
(Continued)

(58) Field of Classification Search
CPC .. G06T 5/009; G06T 5/50; G06T 7/12; G06T 7/521; G06T 7/13; G06T 2207/10028;
(Continued)

(56) References Cited

U.S. PATENT DOCUMENTS 5,128,711 A * 7/1992 Terashita ............... G03B 17/24
355/41
5,463,470 A * 10/1995 Terashita ............. G03B 27/735
358/520
(Continued)

FOREIGN PATENT DOCUMENTS

CN 103559505 A 2/2014
CN 103679175 A * 3/2014
(Continued)

OTHER PUBLICATIONS

Machine English translation of JP2009 278155, 2009.*
(Continued)

*Primary Examiner* — John B Strege
(74) *Attorney, Agent, or Firm* — Young Basile Hanlon & MacFarlane, P.C.

(57) ABSTRACT

The present disclosure provide a control method, a control apparatus, and an electronic device. The method includes processing the scene data to recognize a face region; processing the scene data to acquire depth information of the face region; determining a portrait region based on the face region and the depth information; and controlling the electronic device based on the portrait region.

19 Claims, 39 Drawing Sheets

(51) Int. Cl.
  *G06T 7/521* (2017.01)
  *G06T 7/13* (2017.01)
  *G06K 9/00* (2006.01)
  *G06T 5/50* (2006.01)

(52) U.S. Cl.
  CPC ..... *G06K 9/00369* (2013.01); *G06K 9/00375* (2013.01); *G06T 5/50* (2013.01); *G06T 7/12* (2017.01); *G06T 7/13* (2017.01); *G06T 7/521* (2017.01); *G06T 2207/10028* (2013.01); *G06T 2207/30201* (2013.01)

(58) Field of Classification Search
  CPC ...... G06T 2207/30201; G06K 9/00234; G06K 9/00241; G06K 9/00369; G06K 9/00375; G06K 9/00228
  See application file for complete search history.

(56) References Cited

U.S. PATENT DOCUMENTS

| | | | | |
|---|---|---|---|---|
| 9,858,680 | B2* | 1/2018 | Ishihara | G06K 9/4661 |
| 2007/0052840 | A1* | 3/2007 | Okuno | H04N 5/2351 348/364 |
| 2009/0034838 | A1* | 2/2009 | Umeda | H04N 1/628 382/167 |
| 2011/0304746 | A1* | 12/2011 | Iijima | G03B 7/28 348/229.1 |
| 2012/0008015 | A1* | 1/2012 | Manabe | H04N 5/2355 348/234 |
| 2013/0148853 | A1* | 6/2013 | Hwang | G06K 9/00268 382/103 |
| 2016/0037046 | A1* | 2/2016 | Nashizawa | H04N 5/35536 348/229.1 |
| 2016/0173759 | A1* | 6/2016 | Nakamura | H04N 5/232945 348/222.1 |
| 2017/0163953 | A1* | 6/2017 | Wang | H04N 5/23219 |
| 2019/0066271 | A1* | 2/2019 | Kanbara | G06T 7/11 |
| 2019/0356833 | A1* | 11/2019 | Sun | H04N 9/045 |
| 2020/0007736 | A1* | 1/2020 | Sun | G06T 5/50 |

FOREIGN PATENT DOCUMENTS

| | | |
|---|---|---|
| CN | 103679175 A | 3/2014 |
| CN | 104281839 A | 1/2015 |
| JP | 2009278155 A | 11/2009 |

OTHER PUBLICATIONS

ISR for PCTCN2017076028 with English Translation dated Nov. 29, 2017.
Communication pursuant to Article 94(3) EPC for EP Application 17899328.3 dated Jun. 22, 2021. (5 pages).
OA for EP application No. 17899328.3 dated Feb. 13, 2020.
OA for EP application No. 17899328.3 dated Apr. 30, 2020.
Nguyen TV, Feng J, Yan S.; Seeing human weight from a single RGB-D image. Journal of Computer Science and Technology 29(5): 777-784; Sep. 2014; DOI 10.1007/s11390-014-1467-0.
Face Detection with Automatic White Balance for Digital Still Camera; Yuan-Kai Wangl and Chin-Fa Wang; Department of Electronic Engineering, Fu Jen University, Taiwan pp. 173-178, 2008.
Automatic seeded region growing for color image segmentation; Frank Y. Shih*, Shouxian Cheng; Computer Vision Laboratory, College of Computing Sciences, New Jersey Institute of Technology, Newark, NJ 07102, USA; Received Jan. 29, 2004; received in revised form Apr. 19, 2005; accepted May 5, 2005; pp. 877-886.
Automatic Image Quality Enhancement Based on Exposure Correction and Dominate Color detection; Guo-Shiang Lin, Xian-Wei Ji; Dept. of Computer Science and Information Engineering, Da-Yeh University, Chang-Hua, Taiwan, R.O.C., 2013.
2DHOOF-2DPCA Contour Based Optical Flow Algorithm for Human Activity Recognition; Fadwa Fawzy Center of Informatics Science Nile University, Egypt; Moataz M. Abdelwahab Center of Informatics Science Nile University, Egypt; Wasfy Mikhael Department of EECS University of Central Florida, USA; pp. 1310-1313, 2013.
Indian Examination Report for IN Application 201917038981 dated Oct. 5, 2021. (8 pages).

* cited by examiner portrait region   edges of portrait region color edge map portrait region   portrait region after expanding

METHOD AND DEVICE FOR CONTROLLING AN ELECTRONIC DEVICE BASED ON DETERMINING A PORTRAIT REGION USING A FACE REGION DETECTION AND DEPTH INFORMATION OF THE FACE REGION DETECTED

CROSS-REFERENCE TO RELATED APPLICATION(S)

This application is a continuation of International Application No. PCT/CN2017/076028, filed on Mar. 9, 2017, the entire contents of which are incorporated herein by reference.

TECHNICAL FIELD

The present disclosure relates to the field of image processing technologies, and more particularly, to a depth-based control method, a depth-based control apparatus, and an electronic device.

BACKGROUND

The portrait recognition method in the related art mainly recognizes edges of a portrait through a gray image, which is affected easily by ambient brightness and has a non-ideal accuracy. If a low-accuracy portrait region is recognized, the image processing effect after processing the portrait region is also poor.

SUMMARY

Embodiments of the present disclosure provide a control method, and an electronic device.

A control method, provided in an embodiment of the present disclosure, is for controlling an electronic device based on scene data collected by an imaging apparatus of the electronic device. The control method includes: processing the scene data to recognize a face region; processing the scene data to acquire depth information of the face region; determining a portrait region based on the face region and the depth information; and controlling the electronic device based on the portrait region.

An electronic device provided in the embodiments of the present disclosure, includes an imaging apparatus, a displayer and the control apparatus. The control apparatus is electronically coupled to the displayer and the imaging apparatus.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

These and other aspects and advantages of embodiments of the present disclosure will become apparent and more readily from the following descriptions made with reference to the drawings, in which.

DETAILED DESCRIPTION

Figure 1:
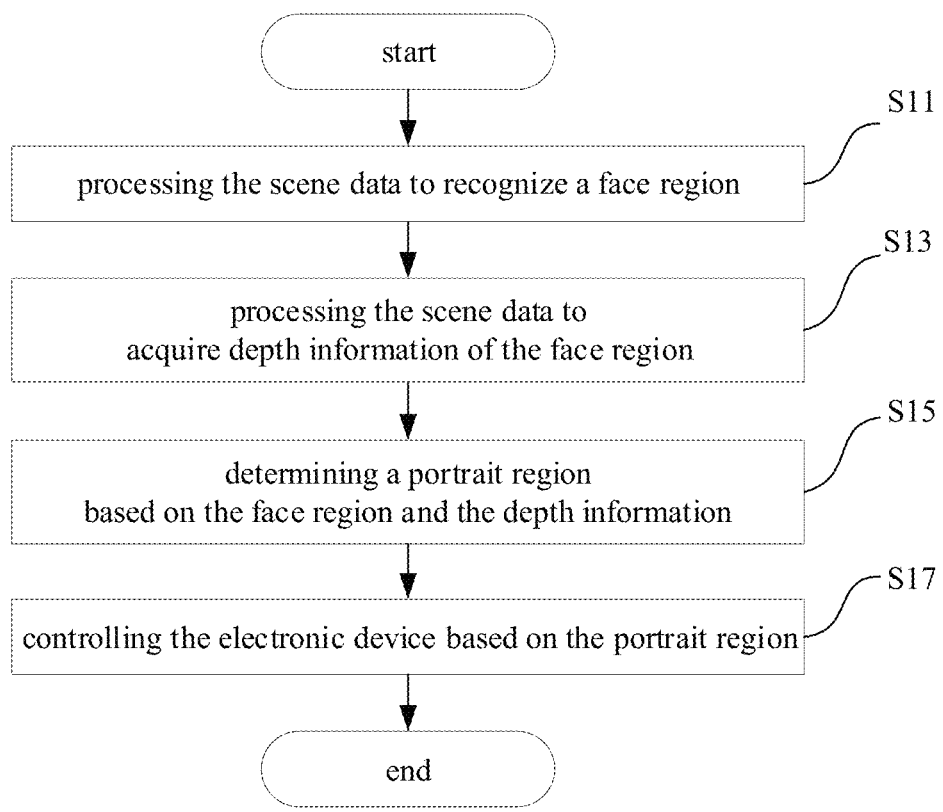
FIG. 1 is a flow chart illustrating a depth-based control method according to some embodiments of the present disclosure.

Reference will now be made in detail to embodiments of the present disclosure, examples of which are illustrated in the drawings. The following description refers to the drawings in which the same or similar numbers in different drawings represent the same or similar elements and the elements having same or similar functions throughout the descriptions unless otherwise represented. The embodiments described below with reference to the drawings are explanatory, and are intended to be illustrative of the present disclosure, and are not to be construed to limit the present disclosure.

Figure 2:
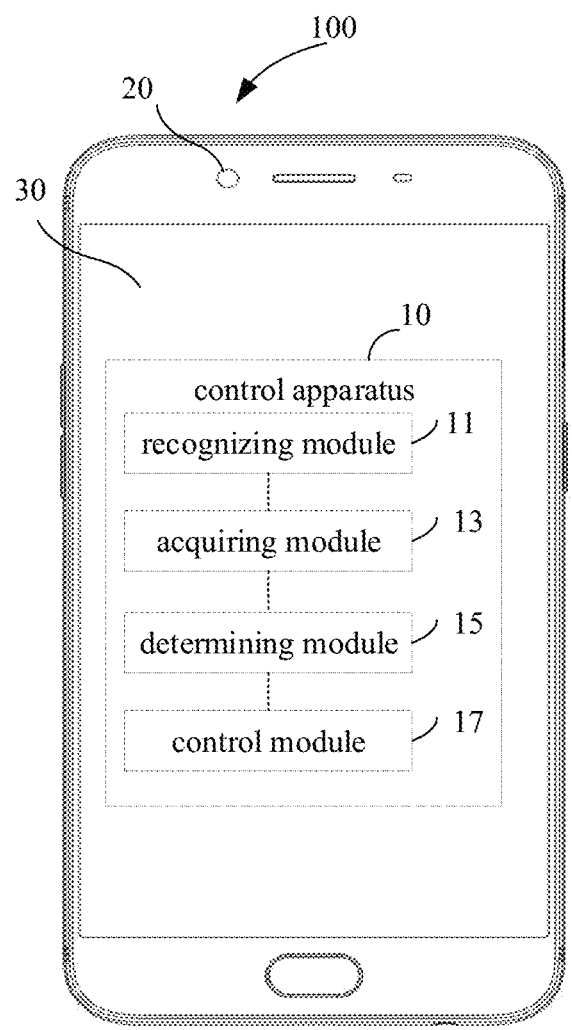
FIG. 2 is a block diagram illustrating an electronic device according to some embodiments of the present disclosure.

Referring to FIG. 1 and FIG. 2 together, a depth-based control method, according to an embodiment of the present disclosure, is for controlling an electronic device 100 based on scene data collected by an imaging apparatus 20 of the electronic device 100. The control method may include acts in the following blocks.

At block S11, the scene data is processed to recognize a face region.

At block S13, the scene data is processed to acquire depth information of the face region.

At block S15, a portrait region is determined based on the face region and the depth information.

At block S17, the electronic device 100 is controlled based on the portrait region.

Referring to FIG. 2 again, the depth-based control method provided in the embodiment of the present disclosure may be implemented by the depth-based control apparatus 10 provided in the embodiment of the present disclosure. The depth-based control apparatus 10 provided in the embodiment of the present disclosure may include a recognizing module 11, an acquiring module 13, a determining module 15, and a control module 17. The act in block S11 may be implemented by the recognizing module 11. The act in block S13 may be implemented by the acquiring module 13. The act in block S15 may be implemented by the determining module 15. The act in block S17 may be implemented by the control module 17.

That is, the recognizing module 11 is configured to process the scene data to recognize a face region. The acquiring module 13 is configured to process the scene data to acquire depth information of the face region. The determining module 15 is configured to determine a portrait region based on the face region and the depth information. The control module 17 is configured to control the electronic device 100 based on the portrait region.

The control apparatus 10 according to the embodiment of the present disclosure may be applied to the electronic device 100 according to the embodiment of the present disclosure. That is, the electronic device 100 according to the embodiment of the present disclosure may include the control apparatus 10 according to the embodiment of the present disclosure. The electronic device 100 according to the embodiment of the present disclosure may further include an imaging apparatus 20 and a displayer 30. The control apparatus 10, the imaging apparatus 20 and the displayer 30 all are electrically coupled.

In some embodiments, the electronic device 100 may include a mobile phone, a tablet computer, a notebook computer, a smart wristband, a smart watch, smart glasses, smart helmet, or the like, which is not limited herein. In the embodiment, the electronic device 100 may include the mobile phone.

Figure 3:
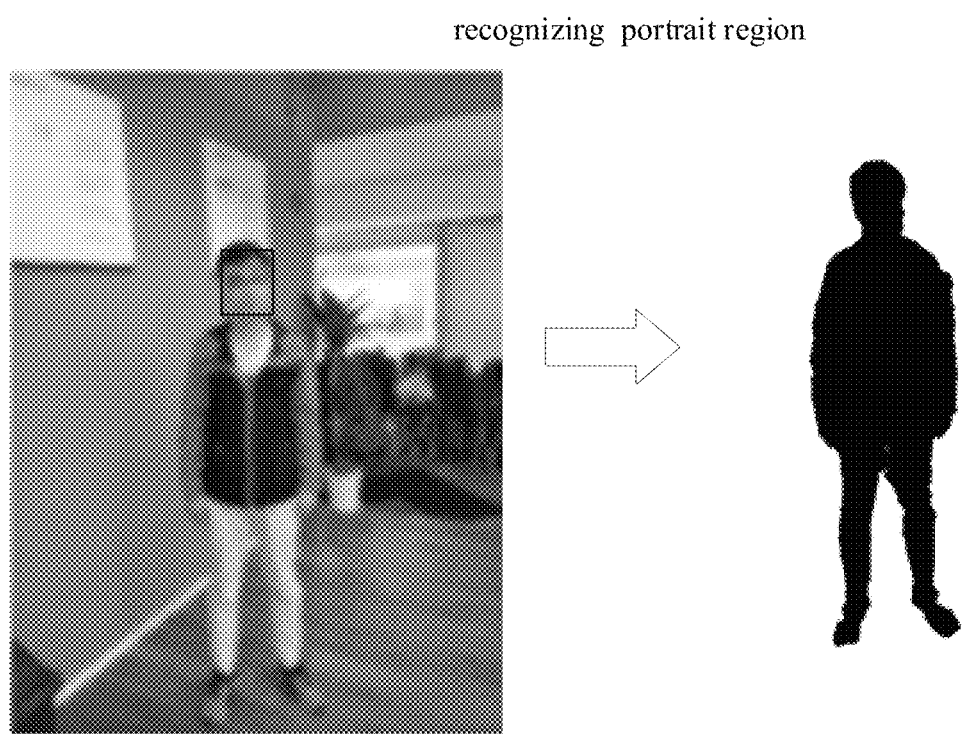
FIG. 3 is a schematic diagram illustrating states of a control method according to some embodiments of the present disclosure.

Referring to FIG. 3, it is to be understood the conventional portrait region recognition is based on the gray image, which is susceptible to interference such as illumination changes, shadows, object occlusion and environmental changes, resulting in inability to accurately recognize the portrait region. The control method provided in the embodiment of the present disclosure may collect color information and depth information of a scene corresponding to the scene data through the imaging apparatus 20, and acquire the depth information of the face region based on the depth information of the scene. The face region is a part of the portrait region, that is, the depth information of the portrait region is in the same depth range as the depth information of the face region. Therefore, the portrait region may be determined based on the depth information of the face region, and the face region. Since the acquisition of the depth information is not easily affected by factors such as illumination and color distribution in the scene, the control method provided in the embodiment of the present disclosure may improve the accuracy of portrait region recognition. Further processing on the image based on the accurately-recognized portrait region may also improve the effect of image processing.

In detail, the scene data collected by the imaging apparatus 20 may include color information and depth information of the current scene. The act in block S11, i.e., processing the scene data to recognize the face region, may detect whether there is a face based on a trained deep-learning model based on the color information and the depth information. Therefore, the accuracy of face detection may be improved.

Figure 4:
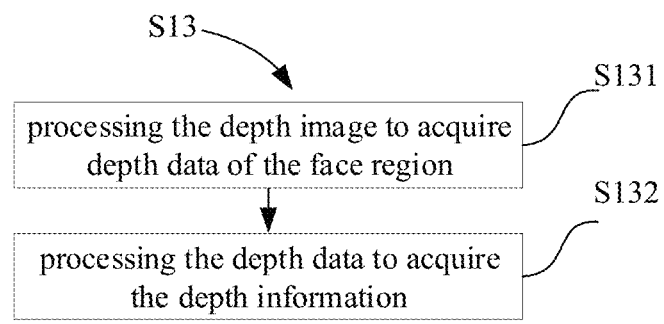
FIG. 4 is a flow chart illustrating a control method according to some embodiments of the present disclosure.

Referring to FIG. 4, in some embodiments, the scene data may include a first cached main image and a depth image corresponding to the first cached main image. The act in block S13, i.e., processing the scene data to acquire the depth information of the face region, may include acts in the following blocks.

At block S131, the depth image is processed to acquire depth data of the face region.

At block S132, the depth data is processed to acquire the depth information.

Figure 5:
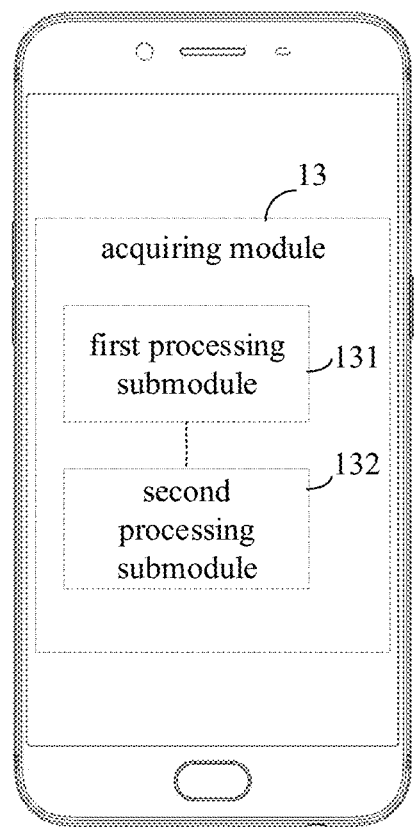
FIG. 5 is a block diagram illustrating an acquiring module according to some embodiments of the present disclosure.

Referring to FIG. 5, in some embodiments, the acquiring module 13 may include a first processing submodule 131 and a second processing submodule 132. The act in block S131 may be implemented by the first processing submodule 131. The act in block S132 may be implemented by the second processing submodule 132.

That is, the first processing submodule 131 is configured to process the depth image to acquire depth data of the face region. The second processing submodule 132 is configured to process the depth data to acquire the depth information.

It is to be understood that the scene data includes a first cached main image and a depth image. The first cached main image is an RGB color image. The depth image includes depth information of each person or object in the scene. Since the color information of the first cached main image has a one-to-one correspondence with the depth information of the depth image, the depth information of the face region may be acquired in the corresponding depth image after the face region is detected.

It should be noted that in the first cached main image, the face region appears as a two-dimensional (2D) image. Since the face region includes features such as a nose, one or more eyes, one or more ears, and the like, the nose, the one or more eyes, the one or more ears, and the like in the face region have different depth data in the depth image. For example, if the face is facing the imaging apparatus 20, the depth data corresponding to the nose may be small in the captured depth image, and the depth data corresponding to the ear may be large. Therefore, in an embodiment of the present disclosure, the depth data of the face region is processed to acquire the depth information of the face region, and the acquired depth information may be a numerical value or a range. When the depth information of the face region is a value, the value may be acquired by averaging the depth data of the face region, or by taking a median value of the depth data of the face region.

In some embodiments, the imaging apparatus 20 includes a depth camera. The depth camera may be configured to acquire the depth image. The depth camera may include a depth camera based on structured-light depth ranging, and a depth camera based on TOF (Time of Flight) ranging.

In detail, the depth camera based on structured-light depth ranging may include a camera and a projector. The projector projects structured light with a certain pattern into a scene to be photographed. A light-strip three-dimensional (3D) pattern may be formed on a surface of each person or object in the scene, which is modulated by each person or object in the scene. The light-strip 3D pattern may be detected by the camera, i.e., a light-strip two-dimensional (2D) distortion image may be acquired. A degree of distortion of strips depends on a relative position between the projector and the camera, and a surface profile or height of each person or object in the scene to be photographed. Since the relative position between the projector and the camera is constant, a 3D contour of the surface of each person or object in the scene may be reproduced based on coordinates of the light-strip 2D distortion image, thereby acquiring the depth information. The structured-light depth ranging has high resolution and measurement accuracy, which may improve the accuracy of the acquired depth information.

The depth camera based on TOF ranging is to record, by a sensor, phase changes when modulated infrared light is emitted from a light-emitting unit to an object and then reflected back from the object. In a range of wavelengths, the depth distance of the entire scene is acquired in real time based on the speed of light. The depth position of each person or object in the scene to be photographed is different, so the time from emitting the modulated infrared light to receiving the modulated infrared light is different. Therefore, the depth information of the scene may be acquired. The depth camera based on TOF ranging may calculate the depth information quickly without being affected by grays and features of the surface of the object to be photographed, which has high real-time performance.

Figure 6:
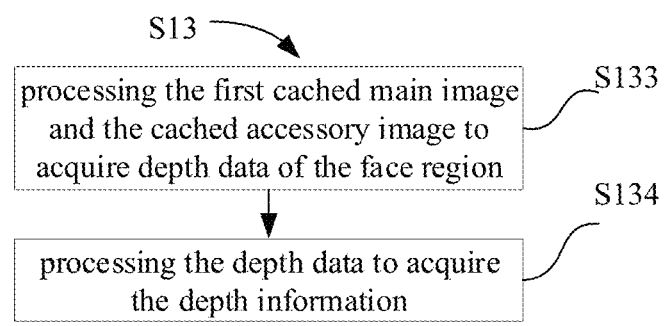
FIG. 6 is a flow chart illustrating a control method according to some embodiments of the present disclosure.

Referring to FIG. 6, in some embodiments, the scene data may include a cached accessory image corresponding to the first cached main image. The act in block S13, i.e., processing the scene data to acquire the depth information of the face region, may include acts in the following blocks.

At block S133, the first cached main image and the cached accessory image are processed to acquire depth data of the face region.

At block S134, the depth data is processed to acquire the depth information.

Figure 7:
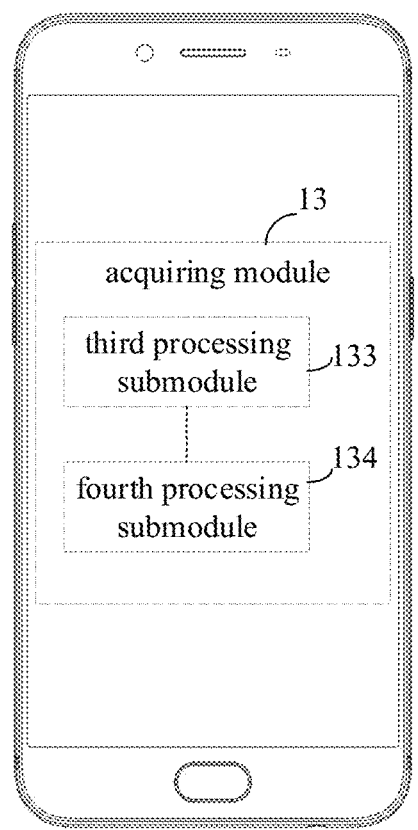
FIG. 7 is a block diagram illustrating an acquiring module according to some embodiments of the present disclosure.

Referring to FIG. 7, in some embodiments, the acquiring module 13 may include a third processing submodule 133 and a fourth processing submodule 134. The act in block S133 may be implemented by the third processing submodule 133. The act in block S134 may be implemented by the fourth processing submodule 134.

That is, the third processing submodule 133 is configured to process the first cached main image and the cached accessory image to acquire depth data of the face region. The fourth processing submodule 134 is configured to process the depth data to acquire the depth information.

In some embodiments, the imaging apparatus 20 may include a main camera and an accessory camera.

It should be understood that the depth information may be acquired by a binocular stereo vision ranging method. The scene data may include the first cached main image and the cached accessory camera. The first cached main image is captured by the main camera. The cached accessory camera is captured by the accessory camera. The first cached main image and the cached accessory image are both RGB color images. Binocular stereo vision ranging is to employ two cameras of the same specification to capture from different positions to acquire a stereo image pair, match corresponding pixel points in the stereo image pair via an algorithm to calculate a parallax, and restore depth information by the triangulation method. In this way, the depth data of the face region may be acquired by matching the stereo image pair of the first cached main image and the cached accessory image. Subsequently, the depth data of the face region is processed to acquire the depth information of the face region. Since the face region contains multiple features, the depth data corresponding to each feature may be different. Therefore, the depth information of the face region may be a numerical range; or the depth data may be averaged to acquire the depth information of the face region, or the median of the depth data is taken as the depth information of the face region.

Figure 8:
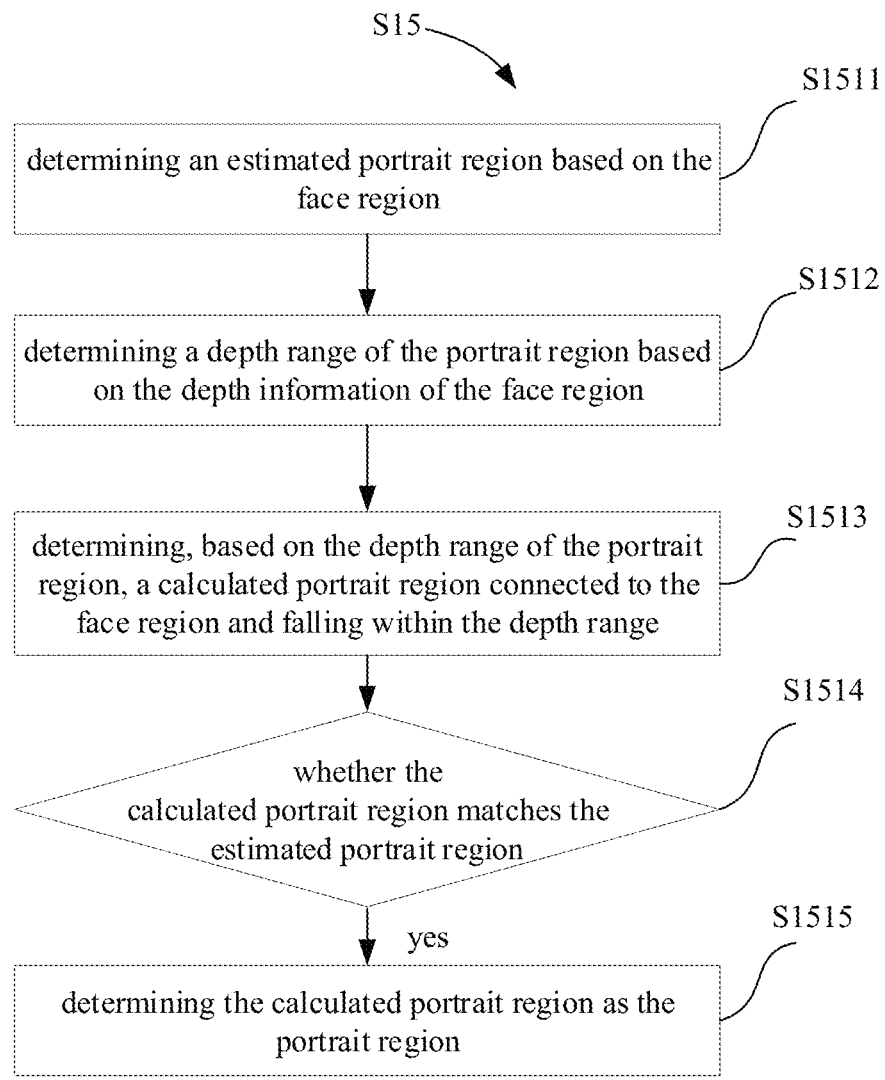
FIG. 8 is a flow chart illustrating a control module according to some embodiments of the present disclosure.

Referring to FIG. 8, in some embodiments, the act in block S15, i.e., determining a portrait region based on the face region and the depth information, may include acts in the following blocks.

At block S1511, an estimated portrait region is determined based on the face region.

At block S1512, a depth range of the portrait region is determined based on the depth information of the face region.

At block S1513, based on the depth range of the portrait region, a calculated portrait region connected to the face region and falling within the depth range, is determined.

At block S1514, it is determined whether the calculated portrait region matches the estimated portrait region.

At block S1515, the calculated portrait region is determined as the portrait region when the calculated portrait region matches the estimated portrait region.

Figure 9:
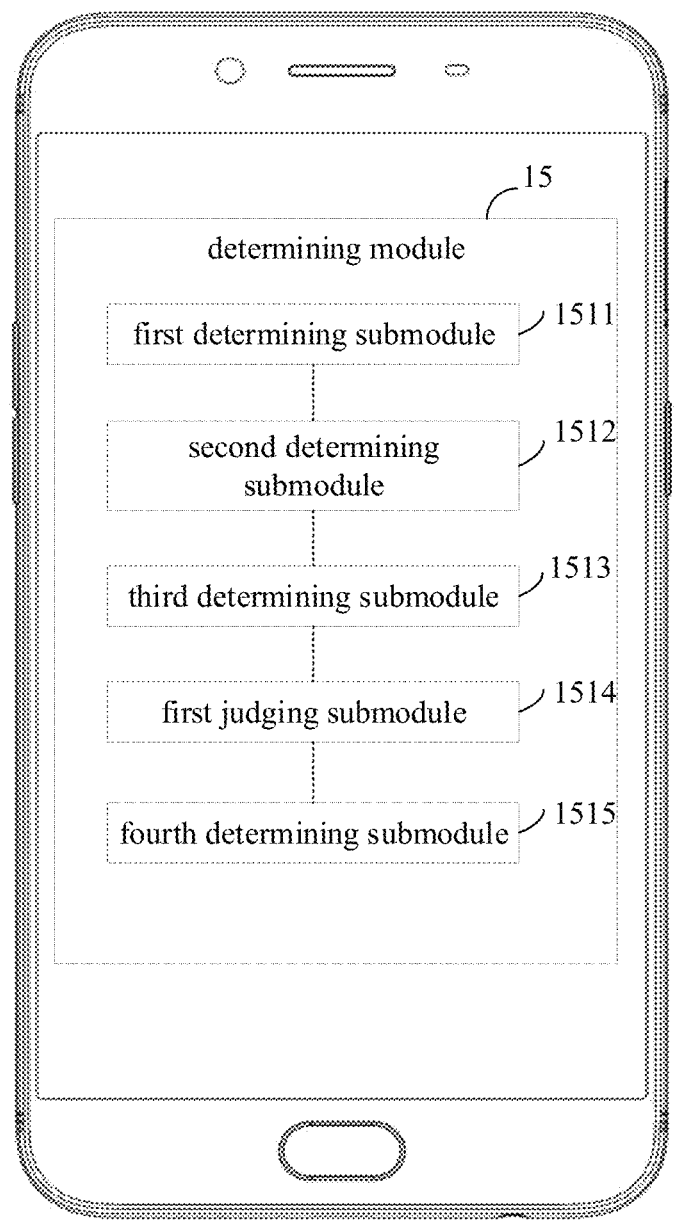
FIG. 9 is a block diagram illustrating a determining module according to some embodiments of the present disclosure.

Referring to FIG. 9, in some embodiments, the determining module 15 may include a first determining submodule 1511, a second determining submodule 1512, a third determining submodule 1513, a first judging submodule 1514, and a fourth determining submodule 1515. The act in block S1511 may be implemented by the first determining submodule 1511. The act in block S1512 may be implemented by the second determining submodule 1512. The act in block S1513 may be implemented by the third determining submodule 1513. The act in block S1514 may be implemented by the first judging submodule 1514. The act in block S1515 may be implemented by the fourth determining submodule 1515.

That is, the first determining submodule 1511 is configured to determine an estimated portrait region based on the face region. The second determining submodule 1512 is configured to determine a depth range of the portrait region based on the depth information of the face region. The third determining submodule 1513 is configured to determine, based on the depth range of the portrait region, a calculated portrait region connected to the face region and falling within the depth range. The first judging submodule 1514 is configured to determine whether the calculated portrait region matches the estimated portrait region. The fourth determining submodule 1515 is configured to determine the calculated portrait region as the portrait region when the calculated portrait region matches the estimated portrait region.

It is to be understood that there are various behavioral postures of the portrait to be photographed such as standing, squatting, facing the lens or side to lens. Therefore, after determining the face region, the estimated portrait region is first determined based on a current state of the face region, that is, a current behavior posture of the portrait is determined based on the current state of the face region. The estimated portrait regions may be a matching sample library of portrait regions. The sample library contains behavioral posture information of various portraits. Since the portrait region includes the face region, that is, the portrait region and the face region are within a certain depth range. Therefore, after determining the depth information of the face region, the depth range of the portrait region may be set based on the depth information of the face region, and the calculated portrait region connected to the face region and falling within the depth range may be extracted based on the depth range of the portrait region. Since the scene in which the portrait is located may be complicated when capturing the portrait, there may be other objects at positions adjacent to the position where the portrait is located, and these objects are within the depth range of the portrait region. Therefore, the extraction of the calculated portrait region may be performed by extracting only the portion connected to the face region and within the depth range of the portrait region to remove other objects falling within the depth range of the portrait region. After determining the calculated portrait region, the calculated portrait region needs to be matched with the estimated portrait region. When the matching is successful, the calculated portrait region may be determined as the portrait region.

Figure 10:
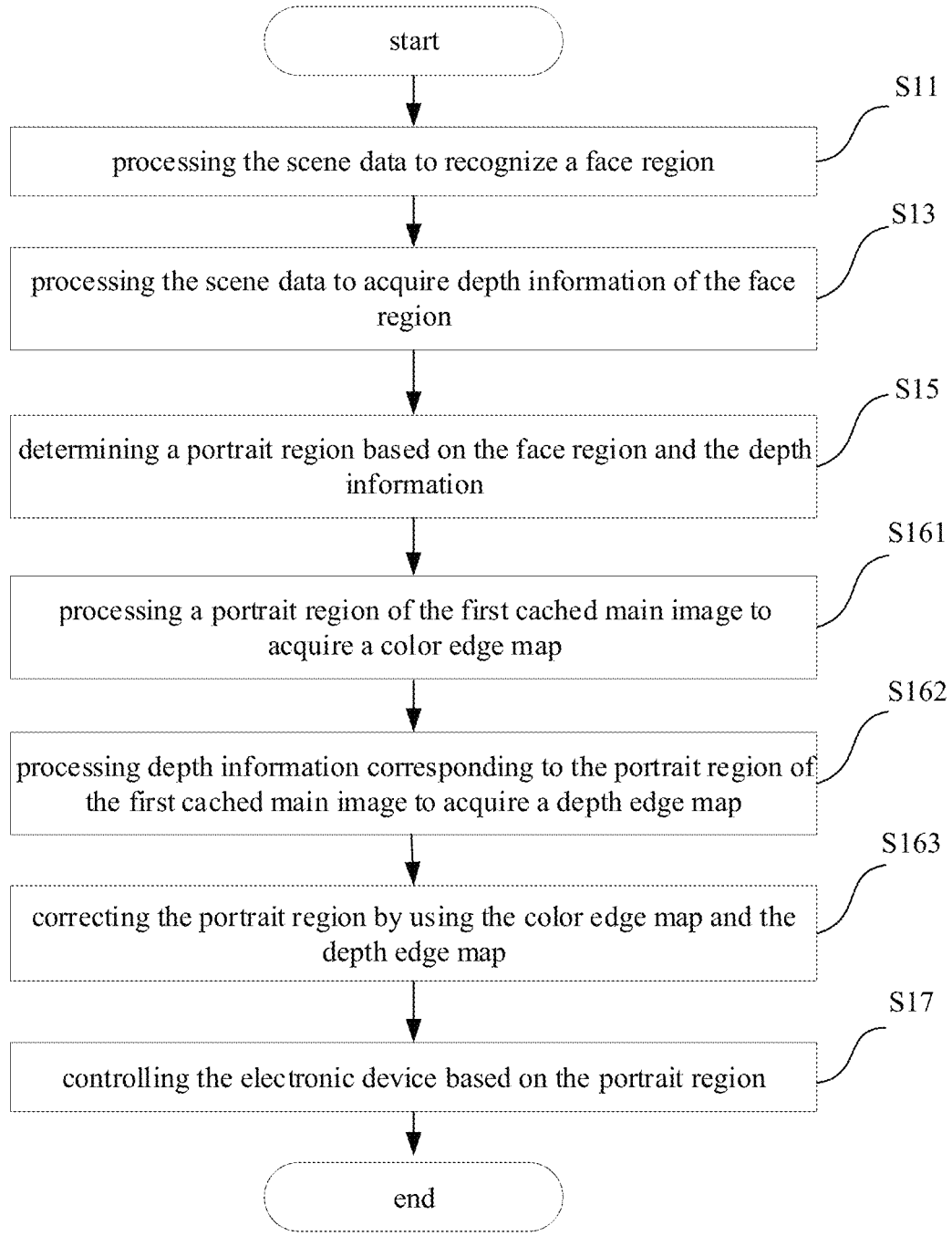
FIG. 10 is a flow chart illustrating a control method according to some embodiments of the present disclosure.

Referring to FIG. 10, in some embodiments, before the act in block S17, i.e., before controlling the electronic device 100 based on the portrait region, the control method provided in the embodiment of the present disclosure may include acts in the following blocks.

At block S161, a portrait region of the first cached main image is processed to acquire a color edge map.

At block S162, depth information corresponding to the portrait region of the first cached main image is processed to acquire a depth edge map.

At block S163, the portrait region is corrected by using the color edge map and the depth edge map.

Figure 11:
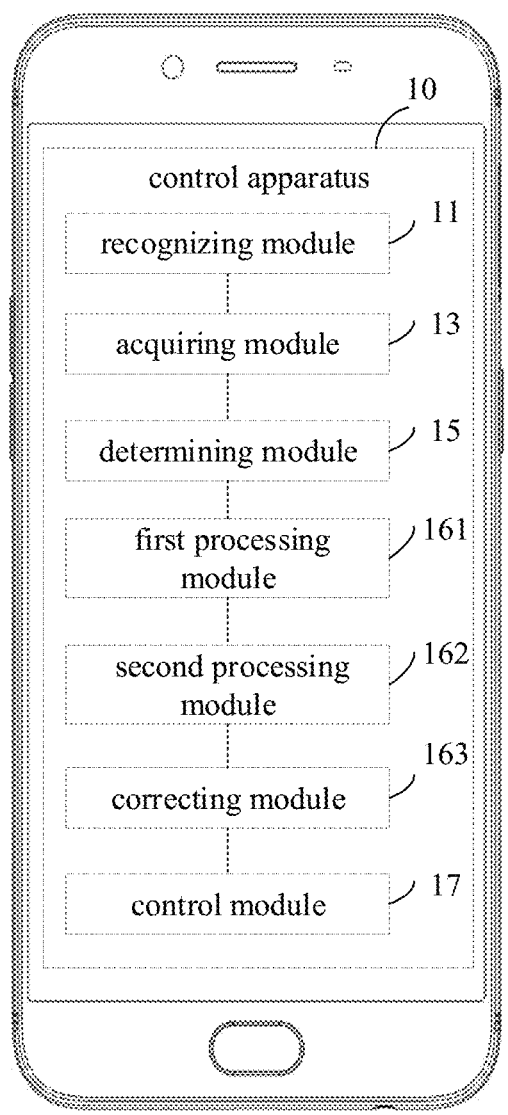
FIG. 11 is a block diagram illustrating a control apparatus according to some embodiments of the present disclosure.

Referring to FIG. 11, in some embodiments, the control apparatus 10 may include a first processing module 161, a second processing module 162, and a correcting module 163. The act in block S161 may be implemented by the first processing module 161. The act in block S162 may be implemented by the second processing module 162. The act in block S163 may be implemented by the correcting module 163

That is, the first processing module 161 is configured to process a portrait region of the first cached main image to acquire a color edge map. The second processing module 162 is configured to process depth information corresponding to the portrait region of the first cached main image to acquire a depth edge map. The correcting module 163 is configured to correct the portrait region by using the color edge map and the depth edge map.

Figure 12:
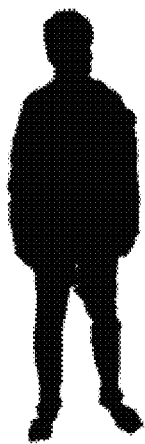
FIG. 12 is a schematic diagram illustrating states of a control method according to some embodiments of the present disclosure.
Figure 12:
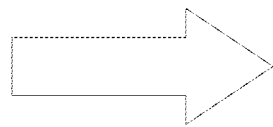
Figure 12:

Referring to FIG. 12, it is to be understood that the color edge map includes edge information inside the portrait region, such as edge information of the costume, and the current depth information has limited accuracy, such as slight errors in edges of fingers, hair, collars, and the like. Therefore, using the color edge map and the depth edge map to jointly correct the edges of the portrait region may remove the details of the face, the costume, and the like contained in the portrait region on one hand, and on the other hand, the edge portion of the fingers, the hair, the collars, and the like are higher accuracy. Therefore, the accurate contour edge information of the portrait region may be acquired. Since the color edge map and the depth edge map are used to process the data corresponding to the portrait region only, the amount of data to be processed is small, and the speed of processing images is fast.

Figure 13:
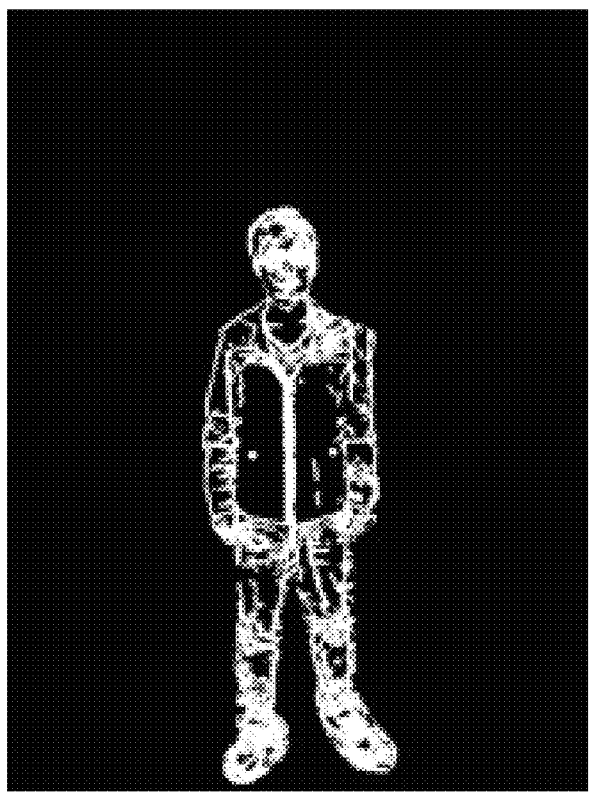
FIG. 13 is a schematic diagram illustrating states of a control method according to some embodiments of the present disclosure.

Referring to FIG. 13, in detail, the color edge map may be acquired by an edge detection algorithm. The edge detection algorithm is to acquire a set of pixel points having a step change or a roof change by differentiating image data corresponding to the portrait region in the first cached main image. Commonly-used edge detection algorithms include Roberts operator, Sobel operator, Prewitt operator, Canny operator, Laplacian operator, LOG operator and so on. The Roberts operator is an operator that employs a local difference operator to find edges. Sobel operator is configured to acquire a first-order gradient of the image. Prewitt operator is a kind of edge detection of first-order differential operator. Canny operator is a kind of multi-level edge detection algorithm. Laplacian operator is a second-order differential operator. LOG operator first smoothes the image and then extracts the edge. In an embodiment of the present disclosure, any one of the edge detection algorithms described above may be employed for calculation to acquire the color edge map, which is not limited herein.

Figure 14:
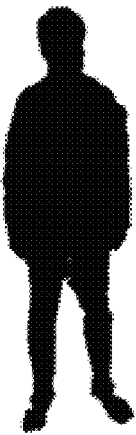
FIG. 14 is a schematic diagram illustrating states of a control method according to some embodiments of the present disclosure.
Figure 14:
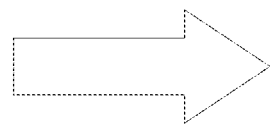
Figure 14:
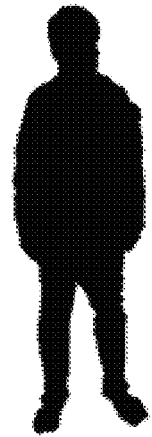

Referring to FIG. 14, further, in the process of acquiring the depth edge map, the depth information corresponding to the portrait region needs to be processed only. The portrait region acquired at the act in block S15 is first expanded, and the portrait region is enlarged to retain detail of the depth edges in the depth information corresponding to the portrait region. Subsequently, the depth information corresponding to the portrait region after the expansion processing, is filtered, thereby removing the high-frequency noise carried in the depth information for smoothing the edge details of the depth edge map acquired at the act in block S162. Finally, the filtered data is converted into gray data, and the gray data is linearly logistically combined, and then the image edge probability density algorithm is employed to calculate the linear logistic combined gray data to acquire the depth edge map.

Figure 15:
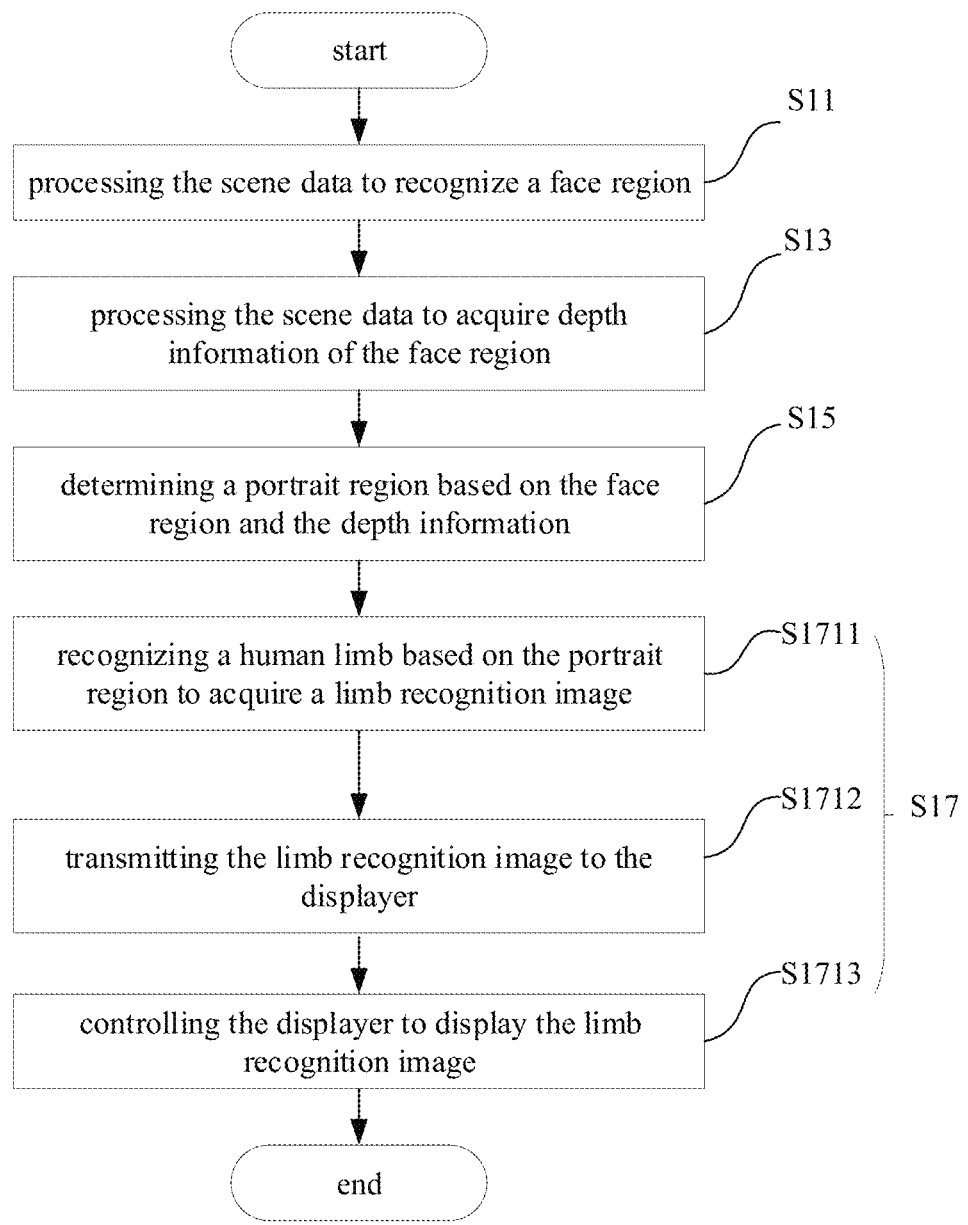
FIG. 15 is a flow chart illustrating a control method according to some embodiments of the present disclosure.

Referring to FIG. 15, in some embodiments, the act in block S17, i.e., controlling the electronic device 100 based on the portrait region may include an act on the following block.

At block S1711, a human limb is recognized based on the portrait region to acquire a limb recognition image.

Figure 16:
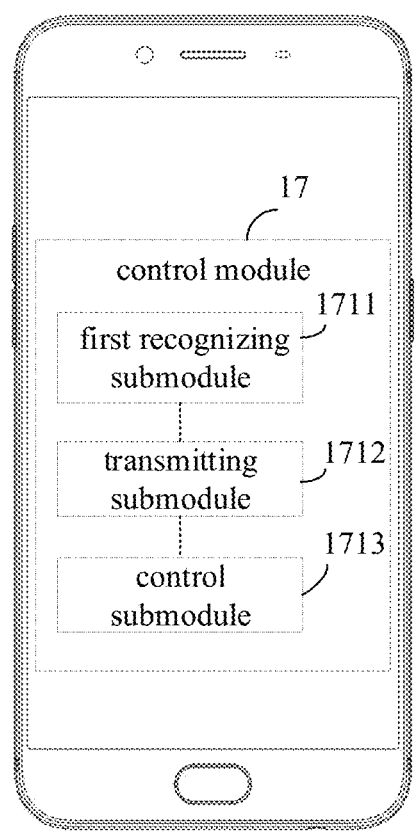
FIG. 16 is a block diagram illustrating a control module according to some embodiments of the present disclosure.

Referring to FIG. 16, in some embodiments, the control module 17 may include a first recognizing submodule 1711. The act in block S1711 may be implemented by the first recognizing submodule 1711. That is, the first recognizing submodule 1711 is configured to recognize a human limb based on the portrait region to acquire a limb recognition image.

Therefore, the person's limb may be recognized based on the more accurate portrait region that is recognized based on the depth information, improving the accuracy of limb recognition.

Figure 17:
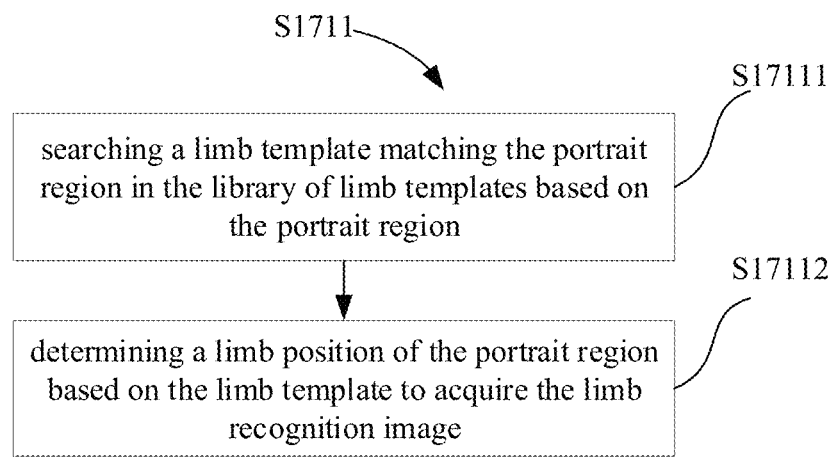
FIG. 17 is a flow chart illustrating a control method according to some embodiments of the present disclosure.

Referring to FIG. 17, in some embodiments, the electronic device 100 may include a database storing a library of limb templates. The act in blocks S1711, i.e., recognizing the human limb based on the portrait region to acquire the limb recognition image, may include acts in the following blocks.

At block S17111, a limb template matching the portrait region is searched in the library of limb templates based on the portrait region.

At block S17112, a limb position of the portrait region is determined based on the limb template to acquire the limb recognition image.

Figure 18:
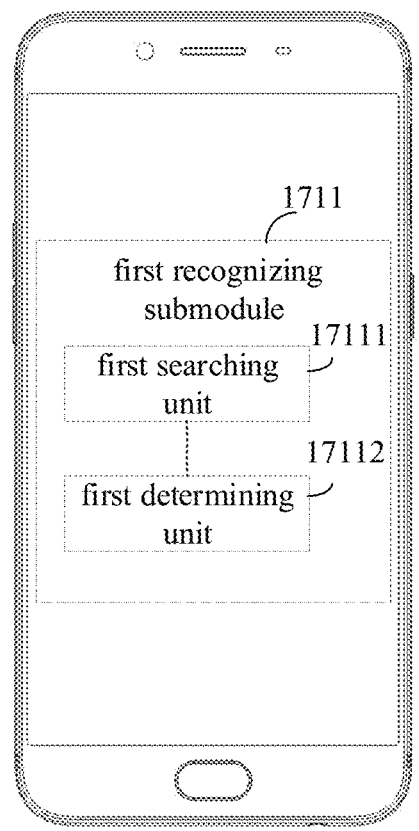
FIG. 18 is a block diagram illustrating a first recognizing submodule according to some embodiments of the present disclosure.

Referring to FIG. 18, in some embodiments, the first recognizing submodule 1711 may include a first searching unit 17111 and a first determining unit 17112. The act in block S17111 may be implemented by the first searching unit 17111. The act in block S17112 may be implemented by the first determining unit 17112.

That is, the first searching unit 17111 is configured to search a limb template matching the portrait region in the library of limb templates based on the portrait region. The first determining unit 17112 is configured to determine a limb position of the portrait region based on the limb template to acquire the limb recognition image.

Figure 19:
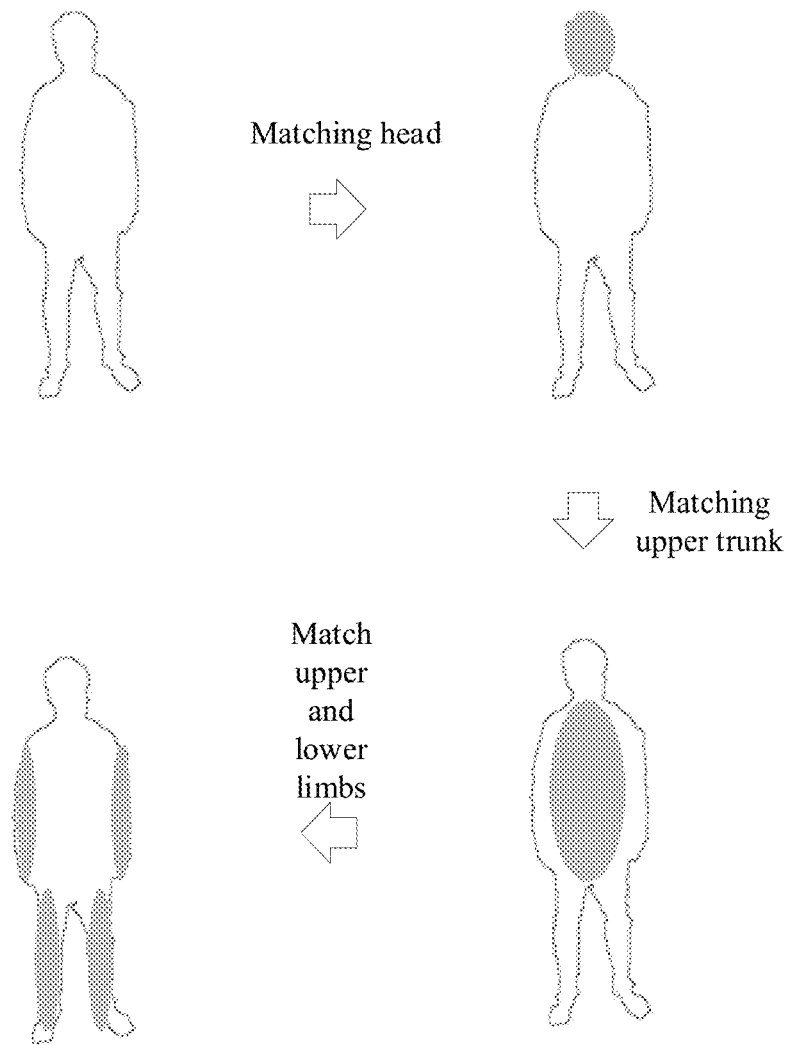
FIG. 19 is a schematic diagram illustrating states of a control method according to some embodiments of the present disclosure.

Referring to FIG. 19, in detail, after acquiring the portrait region, the limb template matching the current portrait region is searched in the library of limb templates. First, matching the head of the portrait region. After matching the head, a next matching of limbs, that is, matching an upper body trunk, is performed on the plurality of limb templates matched by the head. After matching the upper body trunk, a next of matching limbs, that is, matching an upper limb and a lower limb, is performed on the plurality of limb templates in which the head and the upper body trunk are matched. Therefore, a template matching the head, the upper body trunk, the upper limb and the lower limb with the portrait region may be searched. Subsequently, the limb recognition image may be acquired by determining the limb position of the portrait region based on the matched limb template.

Referring to FIG. 2 and FIG. 15 together, in some embodiments, the act in block S17, i.e., controlling the electronic device 100 based on the portrait region, may further include acts in the following blocks.

At block S1712, the limb recognition image is transmitted to the displayer 30.

At block S1713, the displayer 30 is controlled to display the limb recognition image.

Referring to FIG. 16, in some embodiments, the control module 17 may include a transmitting submodule 1712 and a control submodule 1713. The act in block S1712 may be implemented by the transmitting submodule 1712. The act in block S1713 may be implemented by the control submodule 1713.

That is, the transmitting submodule 1712 is configured to transmit the limb recognition image to the displayer 30. The control submodule 1713 is configured to control the displayer 30 to display the limb recognition image.

Therefore, the limb recognition image, which is the result of the person's limb recognition, is displayed on the displayer 30.

Figure 20:
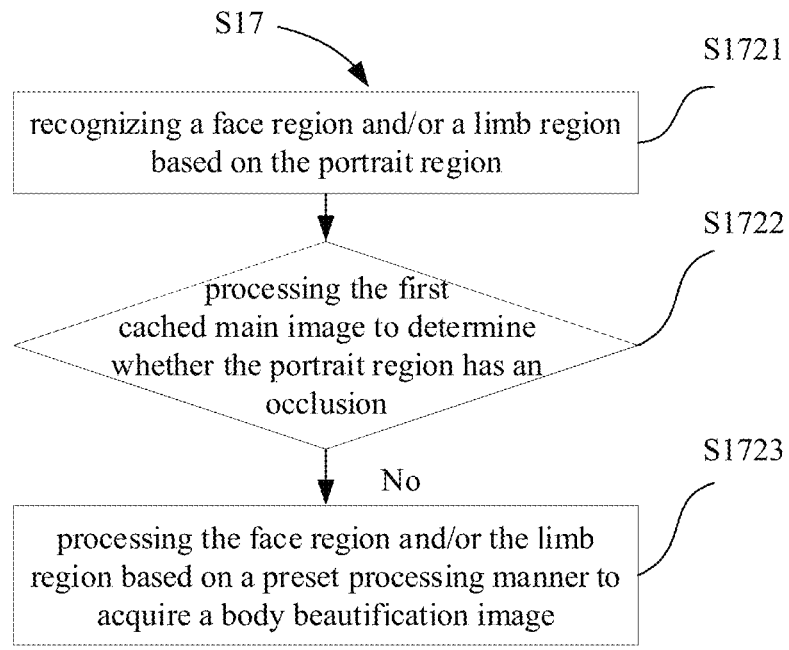
FIG. 20 is a flow chart illustrating a control method according to some embodiments of the present disclosure.

Referring to FIG. 20, in some embodiments, the act in block S17, i.e., controlling the electronic device 100 based on the portrait region, may include acts in the following blocks.

At block S1721, a face region and/or a limb region are recognized based on the portrait region.

At block S1723, the face region and/or the limb region are processed based on a preset processing manner to acquire a body beautification image.

Figure 21:
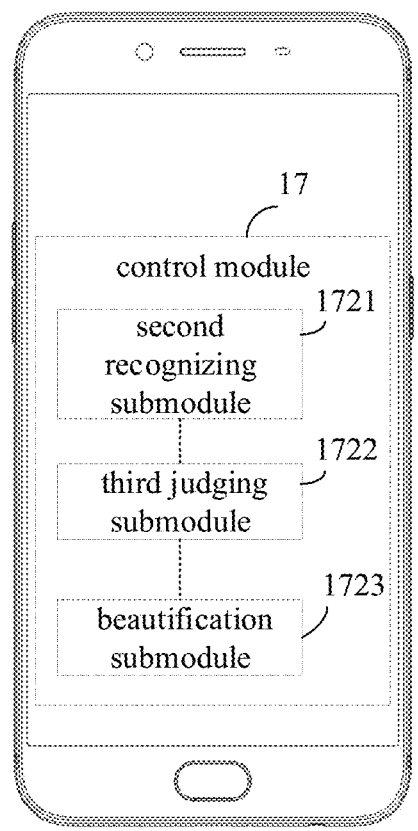
FIG. 21 is a block diagram illustrating a control module according to some embodiments of the present disclosure.

Referring to FIG. 21, in some embodiments, the control module 17 may include a second recognizing submodule 1721 and a beautification submodule 1723. The act in block S1721 may be implemented by the second recognizing submodule 1721. The act in block S1723 may be implemented by the beautification submodule 1723.

That is, the second recognizing submodule 1721 is configured to recognize a face region and/or a limb region based on the portrait region. The beautification submodule 1723 is configured to process the face region and/or the limb region based on a preset processing manner to acquire a body beautification image.

In some embodiments, the preset processing manner may include a facial whitening, a microdermabrasion, a face-lifting, a waist slimming, and/or a leg slimming.

Therefore, since the portrait region is recognized based on the depth information, the recognized portrait region is relatively accurate, and therefore the limb region recognized based on the portrait region is also relatively accurate. In addition, the automatic beautification may be realized without manual operation of the user, and the user experience is improved.

Figure 22:
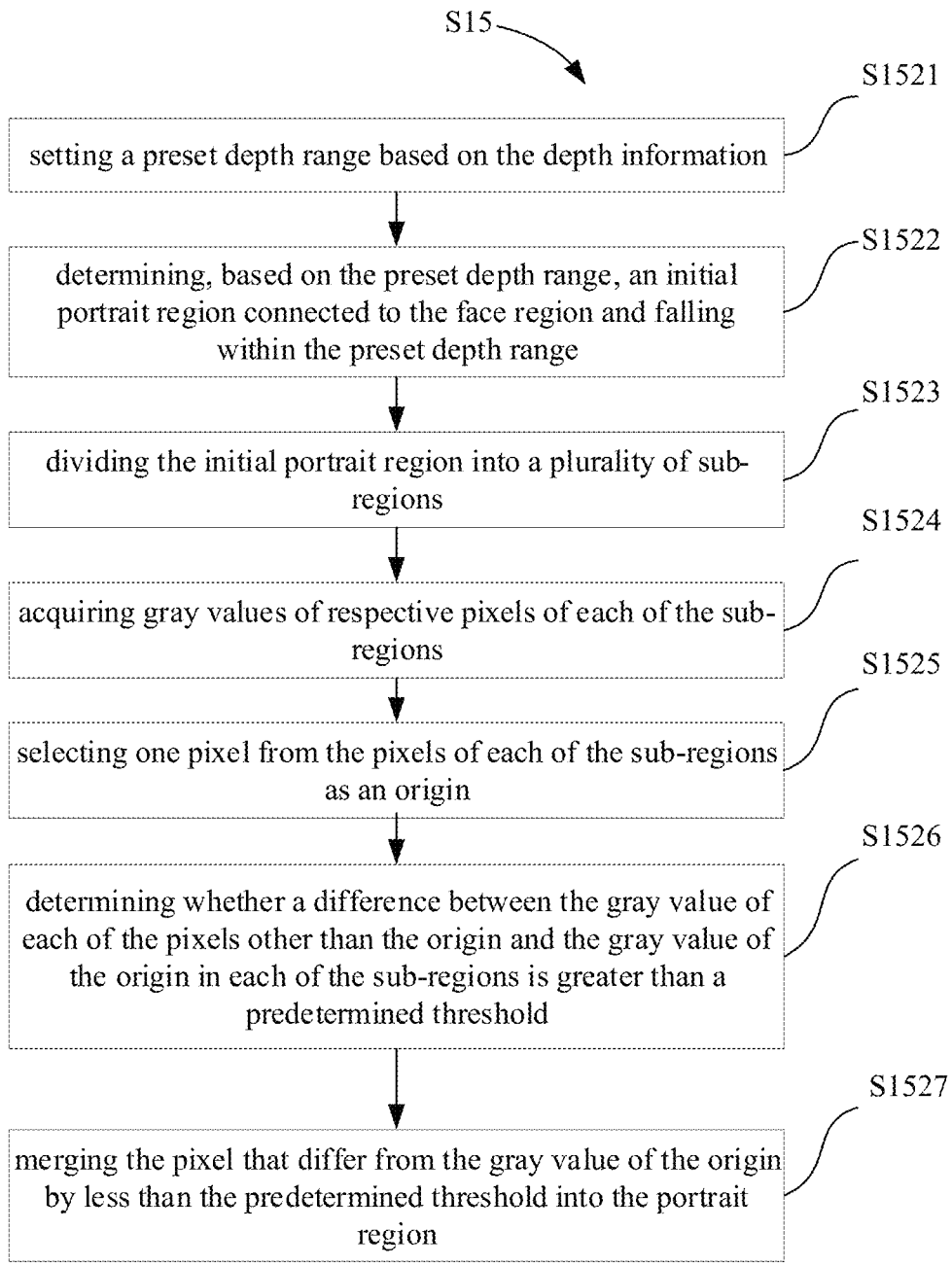
FIG. 22 is a flow chart illustrating a control method according to some embodiments of the present disclosure.

Referring to FIG. 22, in some embodiments, the act in block S15, i.e., determining the portrait region based on the face region and the depth information, may include acts in the following blocks.

At block S1521, a preset depth range is set based on the depth information.

At block S1522, based on the preset depth range, an initial portrait region connected to the face region and falling within the preset depth range is determined.

At block S1523, the initial portrait region is divided into a plurality of sub-regions.

At block S1524, gray values of respective pixels of each of the sub-regions are acquired.

At block S1525, one pixel from the pixels of each of the sub-regions is selected as an origin.

At block S1526, it is determined whether a difference between the gray value of each of the pixels other than the origin and the gray value of the origin in each of the sub-regions is greater than a predetermined threshold.

At block S1527, the pixel that differ from the gray value of the origin by less than the predetermined threshold is merged into the portrait region.

Figure 23:
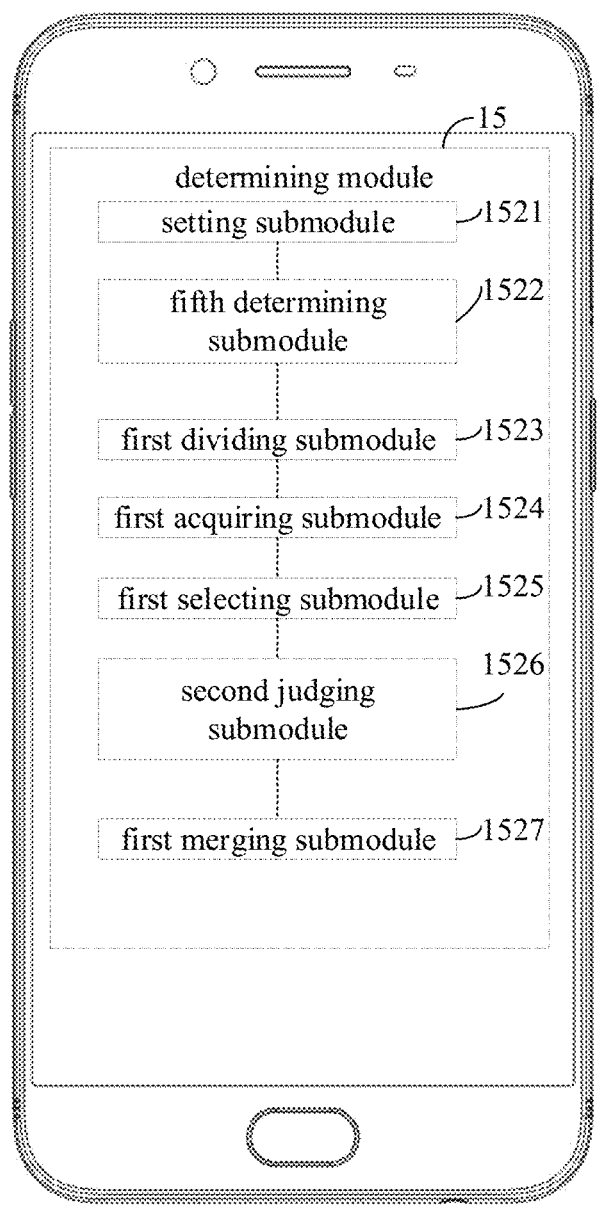
FIG. 23 is a block diagram illustrating a determining module according to some embodiments of the present disclosure.

Referring to FIG. 23, in some embodiments, the determining module 15 may include a setting submodule 1521, a fifth determining submodule 1522, a first dividing submodule 1523, a first acquiring submodule 1524, a first selecting submodule 1525, a second judging submodule 1526, and a first merging submodule 1727. The act in block S1521 may be implemented by the setting submodule 1521. The act in block S1522 may be implemented by the fifth determining submodule 1522. The act in block S1523 may be implemented by the first dividing submodule 1523. The act in block S1524 may be implemented by the first acquiring submodule 1524. The act in block S1525 may be implemented by the first selecting submodule 1525. The act in block S1526 may be implemented by the second judging submodule 1526. The act in block S1527 may be implemented by the first merging submodule 1527.

That is, the setting submodule 1521 is configured to set a preset depth range based on the depth information. The fifth determining submodule 1522 is configured to determine, based on the preset depth range, an initial portrait region connected to the face region and falling within the preset depth range. The first dividing submodule 1523 is configured to divide the initial portrait region into a plurality of sub-regions. The first acquiring submodule 1524 is configured to acquire gray values of respective pixels of each of the sub-regions. The first selecting submodule 1525 is configured to select one pixel from the pixels of each of the sub-regions as an origin. The second judging submodule 1526 is configured to determine whether a difference between the gray value of each of the pixels other than the origin and the gray value of the origin in each of the sub-regions is greater than a predetermined threshold. The first merging submodule 1527 is configured to merge the pixel that differ from the gray value of the origin by less than the predetermined threshold into the portrait region.

As another embodiment of performing a portrait region recognition based on the face region and the depth information, in detail, based on the feature that the face region belongs to a part of the portrait region, the preset depth range may be set based on the depth information of the face region. An initial portrait region may be determined based on the preset depth range. Since there may be other objects in the captured scene which are in the same depth position as the human body, such as potted plants on the left and right sides of the user. Therefore, the initial portrait region may be further corrected by a region growing method. The region growing method starts from a certain pixel of the region and expands to the periphery to gradually add adjacent pixels based on a certain criterion. In detail, the initial portrait region may be divided into the plurality of sub-areas. The gray value of each pixel point of each sub-area may be calculated. One pixel point is selected as an origin from each sub-area, and it may be extended from the origin to the periphery. The pixel points whose difference in gray value are less than a predetermined threshold all are merged into the portrait region. Therefore, the initial portrait region may be corrected to remove other objects that fall within the same depth range as the portrait region.

Referring to FIG. 20 again, in some embodiments, the act in block S17, i.e., controlling the electronic device 100 based on the portrait region, may include an act in the following block, before processing the face region and/or the limb region based on a preset processing manner to acquire a body beautification image at the act in block S1723.

At block S1722, the first cached main image is processed to determine whether the portrait region has an occlusion.

The act in block S1721, i.e., recognizing the face region and/or the limb region based on the portrait region may be performed when the obstruction is absent.

Referring to FIG. 21 again, in some embodiments, the act in block S1722 may be implemented by the third judging submodule 1722. The act in block S1721, i.e., recognizing the face region and/or the limb region based on the portrait region may be performed when the obstruction is absent, which may be implemented by the second recognizing submodule 1721.

That is, the third judging submodule 1722 is configured to process the first cached main image to determine whether the portrait region has an occlusion. The second recognizing submodule 1721 is further configured to recognize the face region and/or the limb region based on the portrait region may be performed when the obstruction is absent.

It is to be understood that the portrait region may be determined based on the preset depth range. There may be an obstruction that does not belong to the human body but within the preset depth range, such as a table and chair in front of the position of the portrait. If the limb recognition and subsequent slimming waist and legs are processed in the presence of the obstruction, the obstruction in the image may be deformed and the visual effect of the image may be affected. Therefore, the portrait region in the first cache main image is not further processed when the obstruction is present. The face region or the limb region may be recognized and the face region or the limb region may be beautified when there is no obstruction. It is determined whether the occlusion exists in the portrait region by determining whether the change of the depth information of the portrait region is a smooth transition. If it is not the smooth transition, it indicates that the occlusion object exists in the portrait region.

Figure 24:
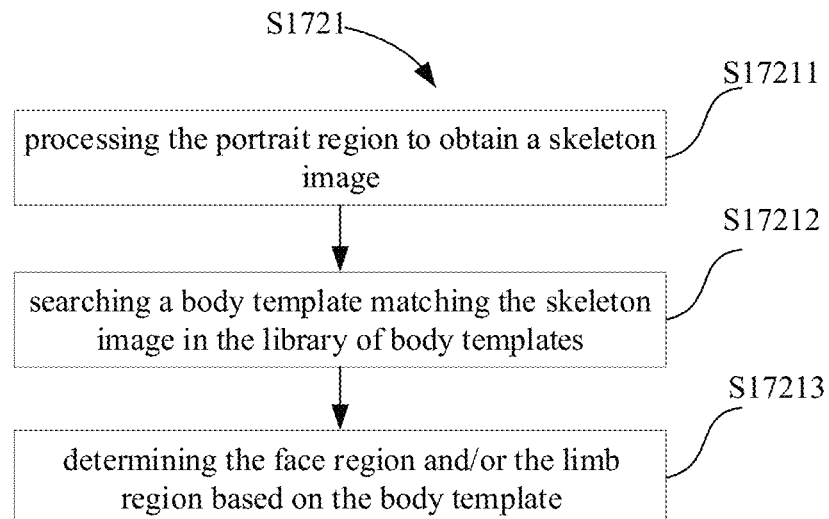
FIG. 24 is a flow chart illustrating a control method according to some embodiments of the present disclosure.

Referring to FIG. 24, in some embodiments, the database stores a library of body templates. The act in block S1721, i.e., recognizing the face region and/or the limb region based on the portrait region, may include acts in the following blocks.

At block S17211, the portrait region is processed to obtain a skeleton image.

At block S17212, a body template matching the skeleton image is searched in the library of body templates.

At block S17213, the face region and/or the limb region is determined based on the body template.

Figure 25:
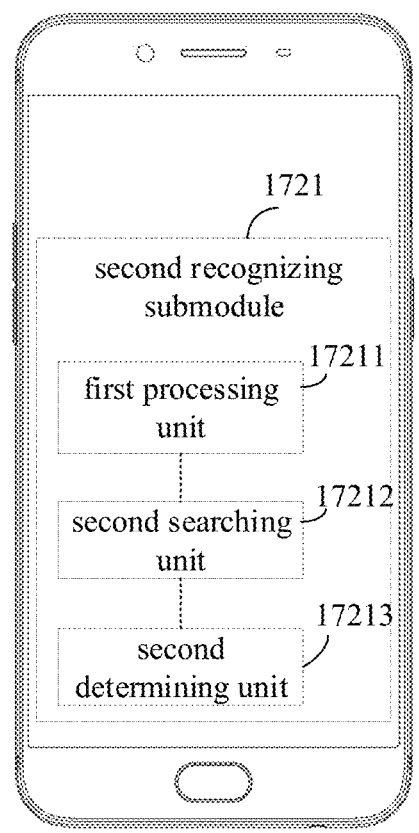
FIG. 25 is a block diagram illustrating a second recognizing submodule according to some embodiments of the present disclosure.

Referring to FIG. 25, in some embodiments, the second recognizing submodule 1721 may include a first processing unit 17211, a second searching unit 17212, and a second determining unit 17213. The act in block S17211 may be implemented by the first processing unit 17211. The act in block S17212 may be implemented by the second searching unit 17212. The act in block S17213 may be implemented by the second determining unit 17213.

That is, the first processing unit 17211 is configured to process the portrait region to obtain a skeleton image. The second searching unit 17212 is configured to search a body template matching the skeleton image in the library of body templates. The second determining unit 17213 is configured to determine the face region and/or the limb region based on the body template.

Therefore, the position of the face region and the limb region of the person in the portrait region may be determined based on the matched template. The autonomous recognition of the face part and the limb part may be realized. Further, the face region and the limb region may be processed with whitening, thinning waist, and the like.

Figure 26:
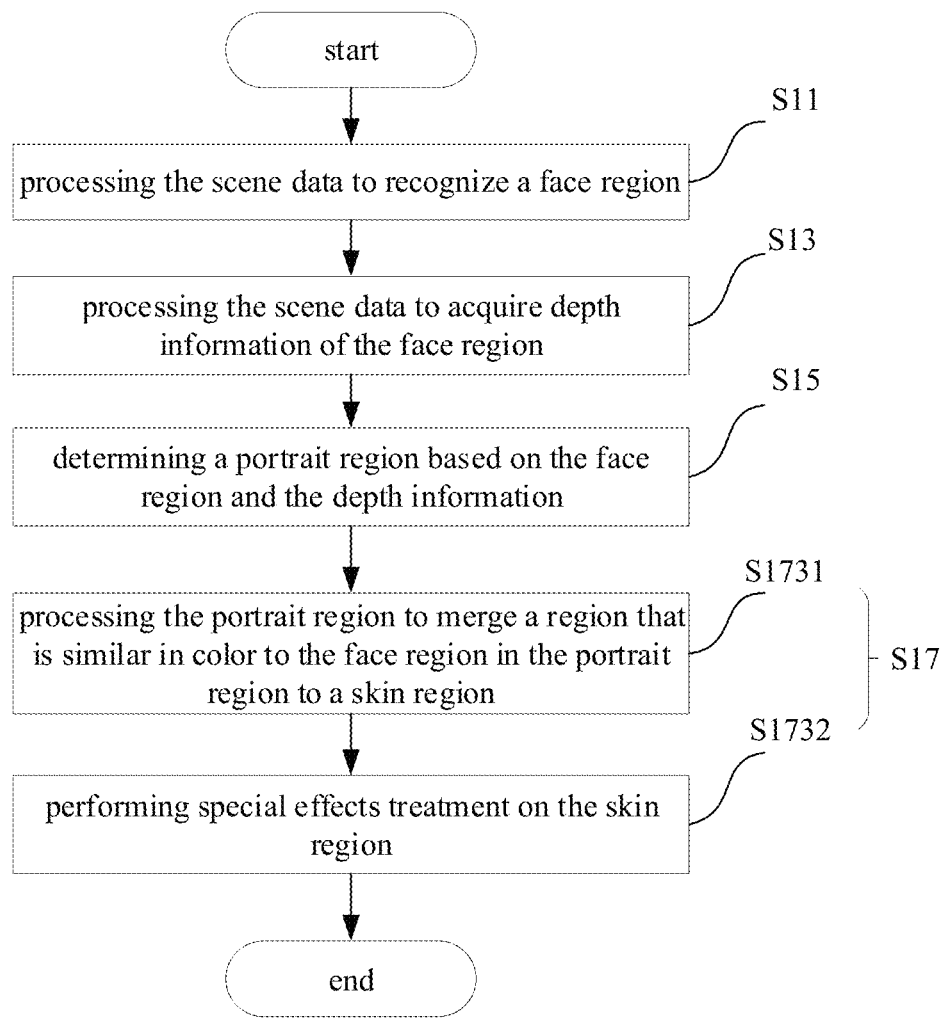
FIG. 26 is a flow chart illustrating a control method according to some embodiments of the present disclosure.

Referring to FIG. 26, in some embodiments, the act in block S17, i.e., controlling the electronic device 100 based on the portrait region, may include an act in the following block.

At block S1731, the portrait region is processed to merge a region that is similar in color to the face region in the portrait region to a skin region.

Figure 27:
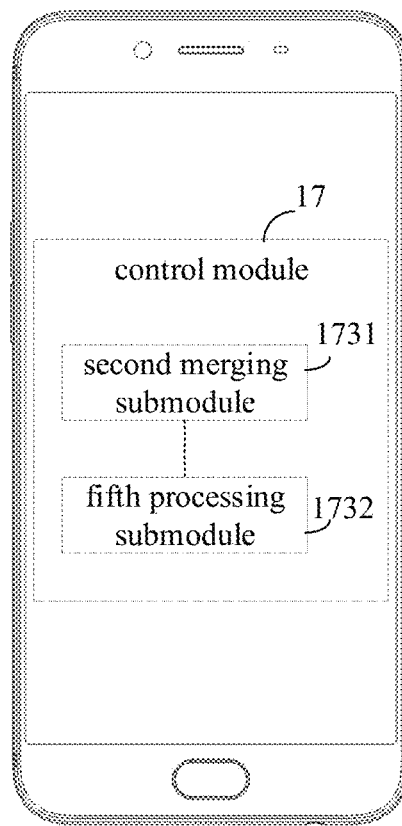
FIG. 27 is a block diagram illustrating a control module according to some embodiments of the present disclosure.

Referring to FIG. 27, in some embodiments, the control module may include a second merging submodule 1731. The act in block S1731 may be implemented by the second merging submodule 1731. That is, the second merging submodule 1731 is configured to process the portrait region to merge a region that is similar in color to the face region in the portrait region to a skin region.

It is to be understood that when the human skin region is recognized, the human skin recognition may be performed on the whole image generally to find the region close to the color of the human skin, to merge into the human skin region. However, the image may contain other objects similar to the color of the human face, such as a yellow table, brown marble, and the like. As a result, the human skin region recognition is inaccurate. After the accurate portrait region is recognized based on the depth information, the region similar to the color of the face skin is found from the portrait region and merged into the human skin region, and the other objects close to the human skin may be prevented from being merged into the human skin region, which improve the accuracy of skin recognition.

Figure 28:
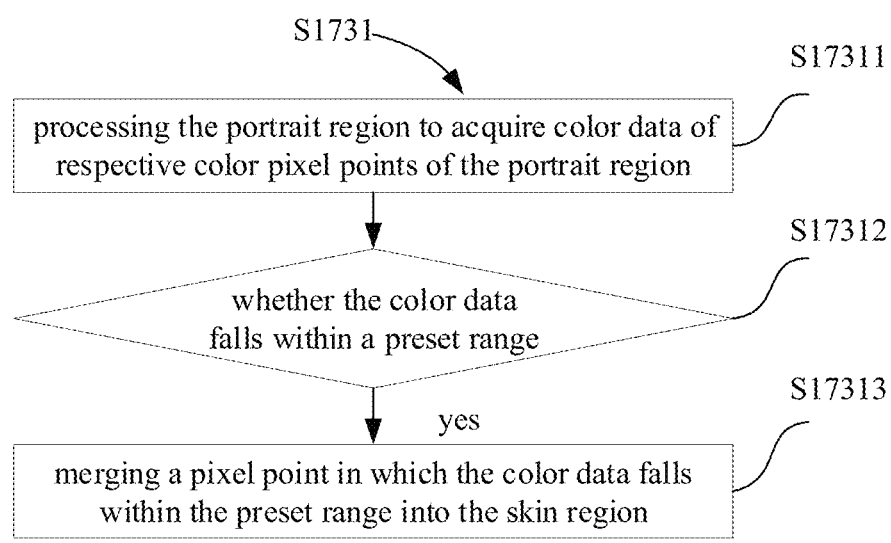
FIG. 28 is a flow chart illustrating a control method according to some embodiments of the present disclosure.

Referring to FIG. 28, in some embodiments, the act in block S1731, i.e., processing the portrait region to merge the sub-region that is similar in color to the face region in the portrait region to the skin region, may include acts in the following blocks.

At block S17311, the portrait region is processed to acquire color data of respective color pixel points of the portrait region.

At block S17312, it is determined whether the color data falls within a preset range.

At block S17313, a pixel point in which the color data falls within the preset range is merged into the skin region.

Figure 29:
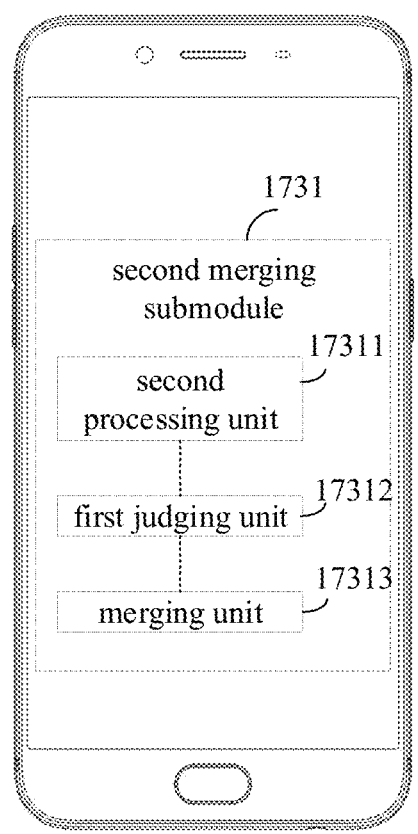
FIG. 29 is a block diagram illustrating a second merging submodule according to some embodiments of the present disclosure.

Referring to FIG. 29, in some embodiments, the second merging submodule 1731 may include a second processing unit 17311, a first judging unit 17312, and a merging unit 17313. The act in block S17311 may be implemented by the second processing unit 17311. The act in block S17312 may be implemented by the first judging unit 17312. The act in block S17313 may be implemented by the merging unit 17313.

That is, the second processing unit 17311 is configured to process the portrait region to acquire color data of respective color pixel points of the portrait region. The first judging unit 17312 is configured to determine whether the color data falls within a preset range. The merging unit 17313 is configured to merge a pixel point in which the color data falls within the preset range into the skin region.

In detail, firstly, the portrait region in the first cache main image of the RGB format is converted into the portrait region image in the YCrCb format, and may be converted by the following formula to calculate the color data in the YCrCb color space of each pixel in the portrait region: $Y=0.299R+0.587G+0.114B$, $Cr=0.500R+0.419G-0.081B+128$, and $Cb=-0.169R-0.331G+0.500B+128$. Each pixel point is detected in the portrait region image. If the color data of the pixel falls within a preset range, that is, $133 \leq Cr \leq 173$ and $77 \leq Cb \leq 127$, the pixel is merged into a human skin region.

In this way, the human skin region may be recognized only from the portrait region, and the interference of other objects similar to the color of the skin region may be removed. In addition, all human skin regions in the portrait region may be recognized, including skin regions such as the face, neck, and hands.

Referring to FIG. 26 again, in some embodiments, the act in block S17, i.e., controlling the electronic device 100 based on the portrait region, may include an act in the following block.

At block S1732, special effects treatment is performed on the skin region.

Referring to FIG. 27 again, in some embodiments, the control module 17 may include a fifth processing submodule 1732. The act in block S1732 may be implemented by the fifth processing submodule 1732. The fifth processing submodule 1732 is configured to perform special effects treatment on the skin region.

Therefore, special effects such as whitening and micro-dermabrasion may be performed on the skin region, and an image with a better visual effect may be acquired, thereby improving the user experience.

Figure 30:
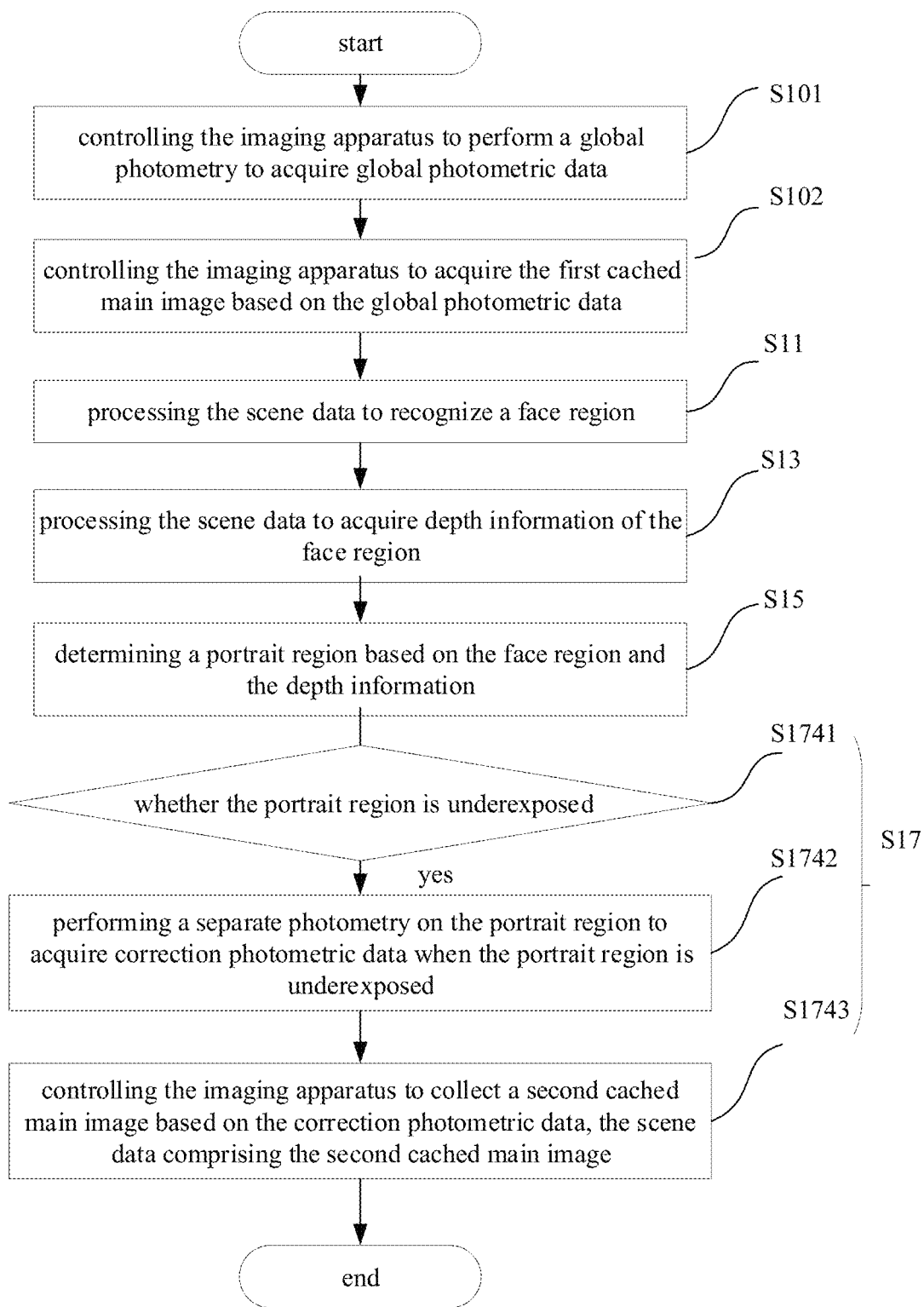
FIG. 30 is a flow chart illustrating a control method according to some embodiments of the present disclosure.

Referring to FIG. 30, in some embodiments, the act in block S17, i.e., controlling the electronic device 100 based on the portrait region, may include acts in the following blocks.

At block S1741, it is determined whether the portrait region is underexposed.

At block S1742, a separate photometry is performed on the portrait region to acquire correction photometric data when the portrait region is underexposed.

At block S1743, the imaging apparatus is controlled to collect a second cached main image based on the correction photometric data. The scene data include the second cached main image.

Figure 31:
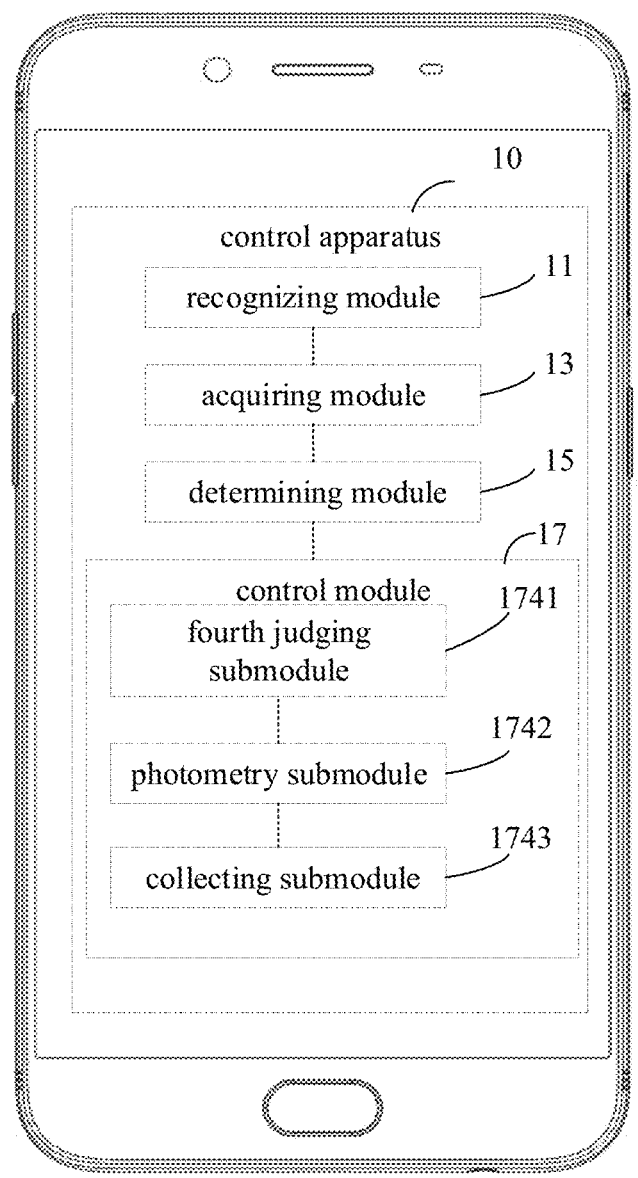
FIG. 31 is a block diagram illustrating a control apparatus according to some embodiments of the present disclosure.

Referring to FIG. 31, in some embodiments, the control module 17 may include a fourth judging submodule 1741, a photometry submodule 1742, and a collecting submodule 1743. The act in block S1741 may be implemented by the fourth judging submodule 1741. The act in block S1742 may be implemented by the photometry submodule 1742. The act in block S1743 may be implemented by the collecting submodule 1743.

That is, the fourth judging submodule 1741 is configured to determine whether the portrait region is underexposed. The photometry submodule 1742 is configured to perform a separate photometry on the portrait region to acquire correction photometric data when the portrait region is underexposed. The collecting submodule 1743 is configured to control the imaging apparatus to collect a second cached main image based on the correction photometric data. The scene data includes the second cached main image.

It is to be understood that when the image is captured in a backlight or backlit environment, the exposure of the imaging apparatus 20 may be controlled by a method of global auto-photometry, which may result in insufficient exposure of the portrait portion. After acquiring the more accurate portrait region based on the depth information, the separate photometry may be performed in the portrait region, and the photometric data may be corrected based on the result of the individual photometry (such as weighting the weight of the portrait region). The second cache main image may be collected based on the correction photometric data, which may improve the brightness of the portrait region due to the separate photometry and exposure compensation. The second cache main image has a better visual effect.

Referring to FIG. 30 again, in some embodiments, the act in block S11, i.e., processing the scene data to recognize the face region, may include acts in the following blocks.

At block S101, the imaging apparatus 20 is controlled to perform a global photometry to acquire global photometric data.

At block S102, the imaging apparatus 20 is controlled to acquire the first cached main image based on the global photometric data.

Referring to FIG. 31, in some embodiments, the act in block S101 may be implemented by the photometry submodule 1742. The act in block S102 may be implemented by the collecting submodule 1743.

That is, the photometry submodule 1742 is further configured to control the imaging apparatus to perform a global photometry to acquire global photometric data. The collecting submodule 1743 is further configured to control the imaging apparatus to collect the first cached main image based on the global photometric data.

In detail, first, the globally photometry is performed on the captured scene, and exposure compensation is performed based on the global photometric data, and then the image capturing is performed to acquire the first cached main image. That is, the first cached main image is an image that has been subjected to global photometry and exposure compensation based on the global photometric data. Therefore, the first cached main image acquired after the global photometry has a suitable brightness, which facilitates subsequent face detection and recognition.

Figure 32:
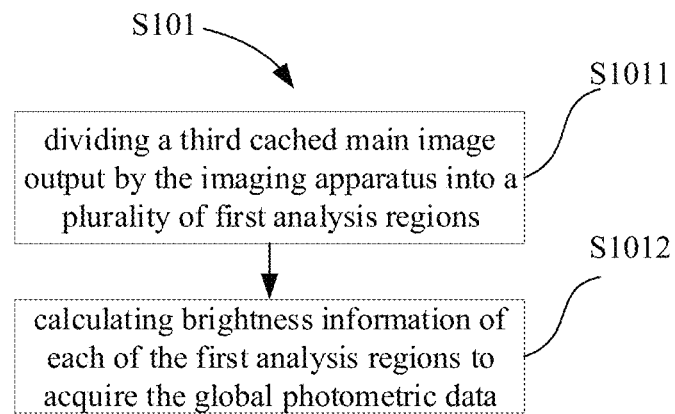
FIG. 32 is a flow chart illustrating a control method according to some embodiments of the present disclosure.

Referring to FIG. 32, in some embodiments, the act in block S101, i.e., controlling the imaging apparatus 20 to perform the global photometry to acquire the global photometric data, may include acts in the following blocks.

At block S1011, a third cached main image output by the imaging apparatus 20 is divided into a plurality of first analysis regions. The scene data includes the third cached main image.

At block S1012, brightness information of each of the first analysis regions is calculated to acquire the global photometric data.

Figure 33:
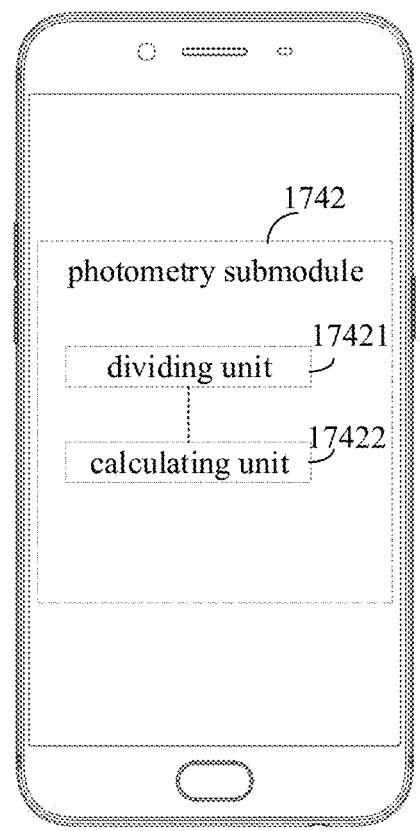
FIG. 33 is a block diagram illustrating a photometry submodule according to some embodiments of the present disclosure.

Referring to FIG. 33, in some embodiments, the photometry submodule 1742 may include a dividing unit 17421 and a calculating unit 17422. The act in block S1011 may be implemented by the dividing unit 17421. The act in block S1012 may be implemented by the calculating unit 17422.

That is, the dividing unit 17421 is configured to divide a third cached main image output by the imaging apparatus into a plurality of first analysis regions. The scene data includes the third cached main image. The calculating unit 17422 is configured to calculate brightness information of each of the first analysis regions to acquire the global photometric data.

In detail, the global photometry may adopt methods, such as center-weighted average photometry, central part photometry, splitting photometry. In an embodiment of the present disclosure, the global photometry may adopt the splitting photometry. The imaging apparatus 20 first outputs the third cached main image, which is an image that has not undergone global photometry and exposure compensation processing. The dividing unit 17421 divides the third cached main image into the plurality of first analysis regions. After calculating the brightness information of each first analysis region, the calculating unit 17422 performs weighting calculation on each first analysis region by using different weighting values, and averages the weighted calculation results to acquire the final photometric data. The splitting photometry is an intelligent photometry method that simulates the situation in which the human brain estimates uniform or uneven illumination of the scene, and measures and evaluates the brightness of the entire scene, thereby acquiring an overall balanced exposure effect. The captured image is better.

Figure 34:
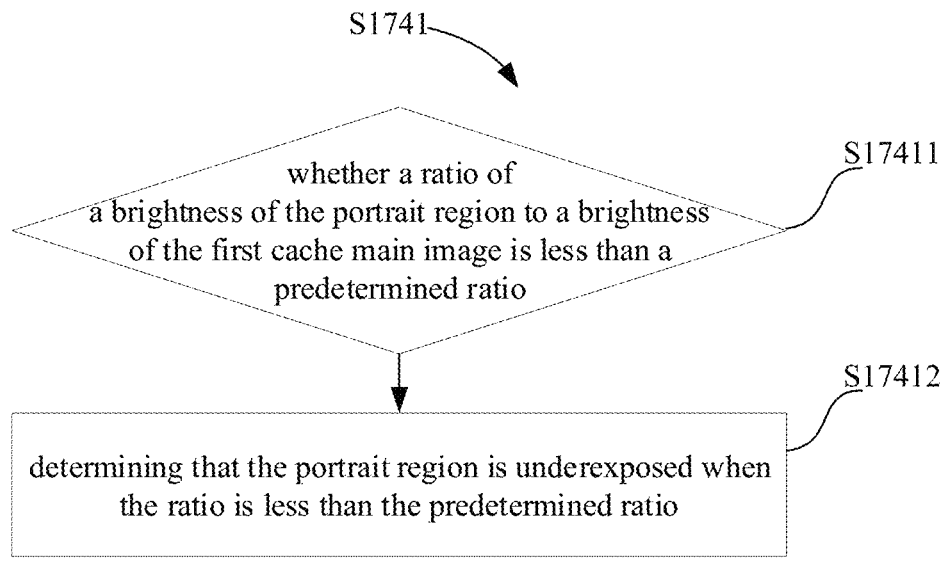
FIG. 34 is a flow chart illustrating a control method according to some embodiments of the present disclosure.

Referring to FIG. 34, in some embodiments, the act in block S1741, i.e., determining whether the portrait region is underexposed, may include acts in the following blocks.

At block S17411, it is determined whether a ratio of a brightness of the portrait region to a brightness of the first cache main image is less than a predetermined ratio.

At block S17412, it is determined that the portrait region is underexposed when the ratio is less than the predetermined ratio.

Figure 35:
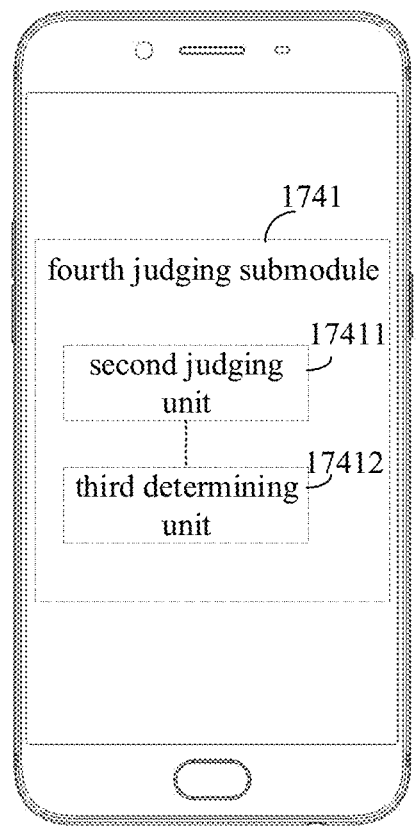
FIG. 35 is a block diagram illustrating a fourth judging submodule according to some embodiments of the present disclosure.

Referring to FIG. 35, in some embodiments, the fourth judging submodule 1741 may include a second judging unit 17411 and a third determining unit 17412. The act in block S17411 may be implemented by the second judging unit 17411. The act in block S17412 may be implemented by the third determining unit 17412.

That is, the second judging unit 17411 is configured to determine whether a ratio of a brightness of the portrait region to a brightness of the first cache main image is less than a predetermined ratio. The third determining unit 17412 is configured to determine that the portrait region is underexposed when the ratio is less than the predetermined ratio.

It is to be understood that the first cached main image is an image that is subjected to global photometry and subjected to exposure compensation based on the global photometric data. If the ratio of the brightness of the portrait region to the brightness of the first cache main image is less than the predetermined ratio, it indicates that the brightness of the portrait region is dark and the exposure is insufficient, and additional correction and exposure compensation for the portrait region are required. If the ratio of the brightness of the portrait region to the brightness of the first cache main image is greater than the predetermined ratio, it indicates that the exposure of the portrait region is sufficient, and no additional correction or exposure compensation is required for the portrait region.

Figure 36:
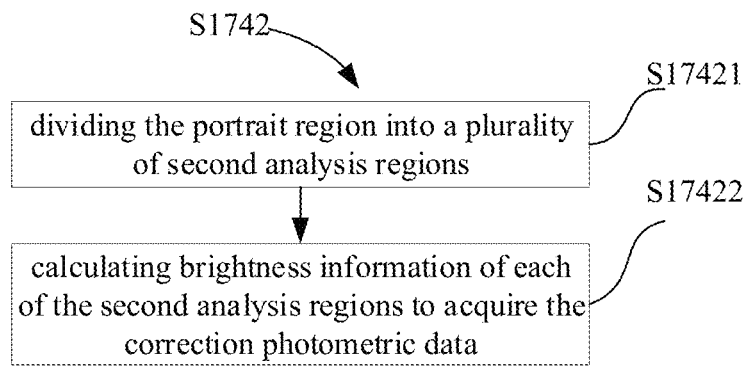
FIG. 36 is a flow chart illustrating a control method according to some embodiments of the present disclosure.

Referring to FIG. 36, in some embodiments, the act in block S1742, i.e., performing the separate photometry on the portrait region to acquire the correction photometric data when the portrait region is underexposed, may include acts in the following blocks.

At block S17421, the portrait region is divided into a plurality of second analysis regions.

At block S17422, brightness information of each of the second analysis regions is calculated to acquire the correction photometric data.

Referring to FIG. 33 again, in some embodiments, the act in block S17421 may be implemented by the dividing unit 17421. The act in block S17422 may be implemented by the calculating unit 17422.

That is, the dividing unit 17421 is further configured to divide the portrait region into a plurality of second analysis regions. The calculating unit 17422 is further configured to calculate brightness information of each of the second analysis regions to acquire the correction photometric data.

Therefore, the separate photometry is performed on the portrait region. The correction and exposure compensation may be performed on the portrait region to enhance the brightness of the portrait region.

Figure 37:
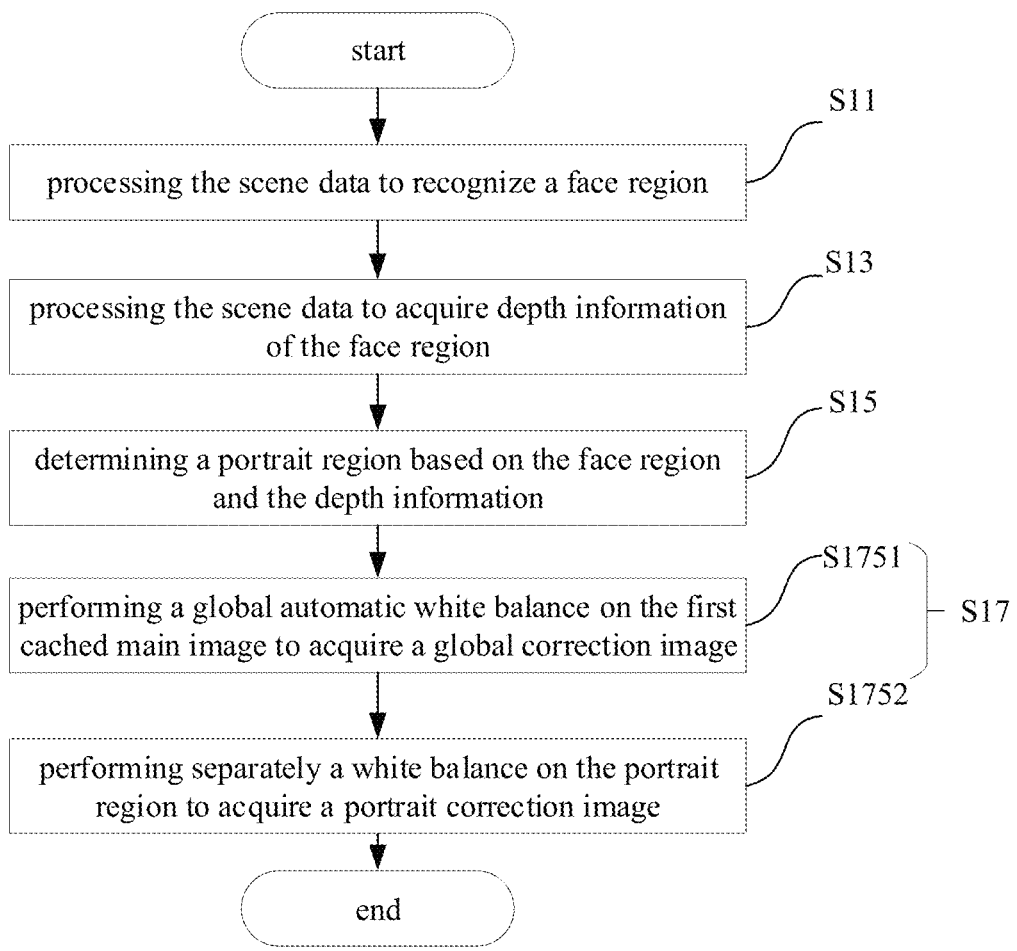
FIG. 37 is a flow chart illustrating a control method according to some embodiments of the present disclosure.

Referring to FIG. 37, in some embodiments, the act in block S17, i.e., controlling the electronic device 100 based on the portrait region, may include an act in the following block.

At block S1752, a white balance is performed separately on the portrait region to acquire a portrait correction image.

Figure 38:
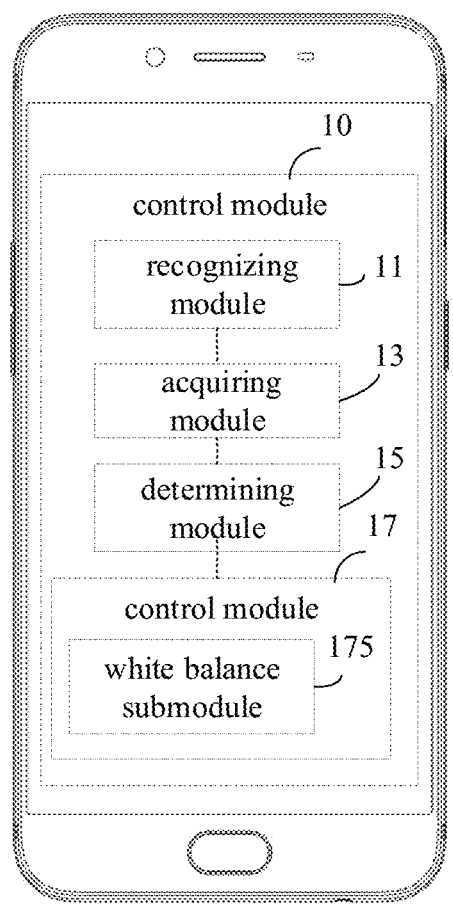
FIG. 38 is a block diagram illustrating a control apparatus according to some embodiments of the present disclosure.

Referring to FIG. 38, in some embodiments, the control module may include a white balance submodule 1752. The act in block S1752 may be implemented by the white balance submodule 1752. That is, the white balance submodule 1752 is configured to perform separately a white balance on the portrait region to acquire a portrait correction image.

Therefore, the white balance processing is performed on the more accurate portrait region recognized based on the depth information to acquire an image with a better visual effect, thereby improving the user experience.

In some embodiments, the method of separately performing white balance processing on the portrait region includes manual white balance or automatic white balance based on color values of the portrait region, which is not limited herein. It should be noted that the manual white balance means that the white balance correction values are acquired by photographing a subject that the user wants to photograph as white.

Figure 39:
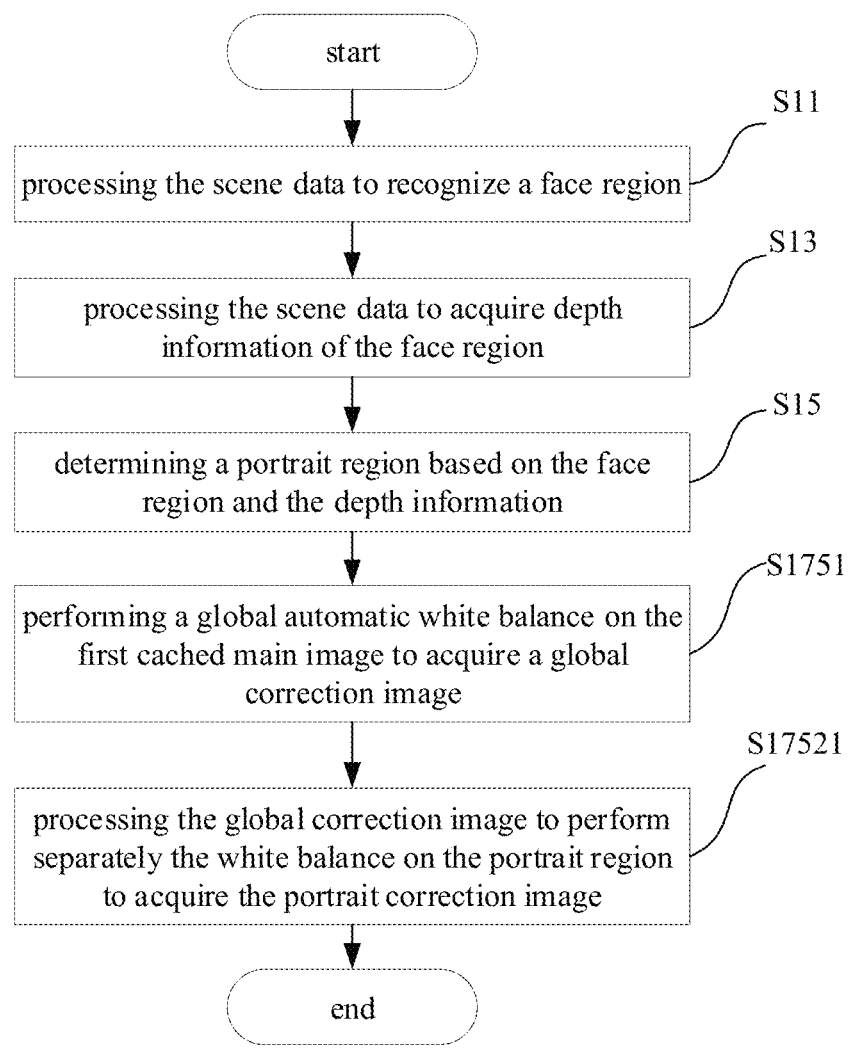
FIG. 39 is a flow chart illustrating a control method according to some embodiments of the present disclosure.

Referring to FIG. 39, in some embodiments, the act in block S17, i.e., controlling the electronic device 100 based on the portrait region, may further include an act in the following block.

At block S1751, a global automatic white balance is performed on the first cached main image to acquire a global correction image.

The act in block S1752, i.e., performing separately the white balance on the portrait region to acquire the portrait correction image, may include an act in the following block.

At block S17521, the global correction image is processed to perform separately the white balance on the portrait region to acquire the portrait correction image.

Referring to FIG. 38, in some embodiments, the act in block S1751 and the act in block S17521 may be implemented by the white balance submodule 175.

That is, the white balance submodule 175 is configured to: perform a global automatic white balance on the first cached main image to acquire a global correction image; and process the global correction image to perform separately the white balance on the portrait region to acquire the portrait correction image.

Therefore, the influence of the white balance on the remaining background portion other than the portrait region may be reduced, so that the white balance of the portrait region is more accurate, and the layer of the portrait region and the remaining background portion is more distinct.

Figure 40:
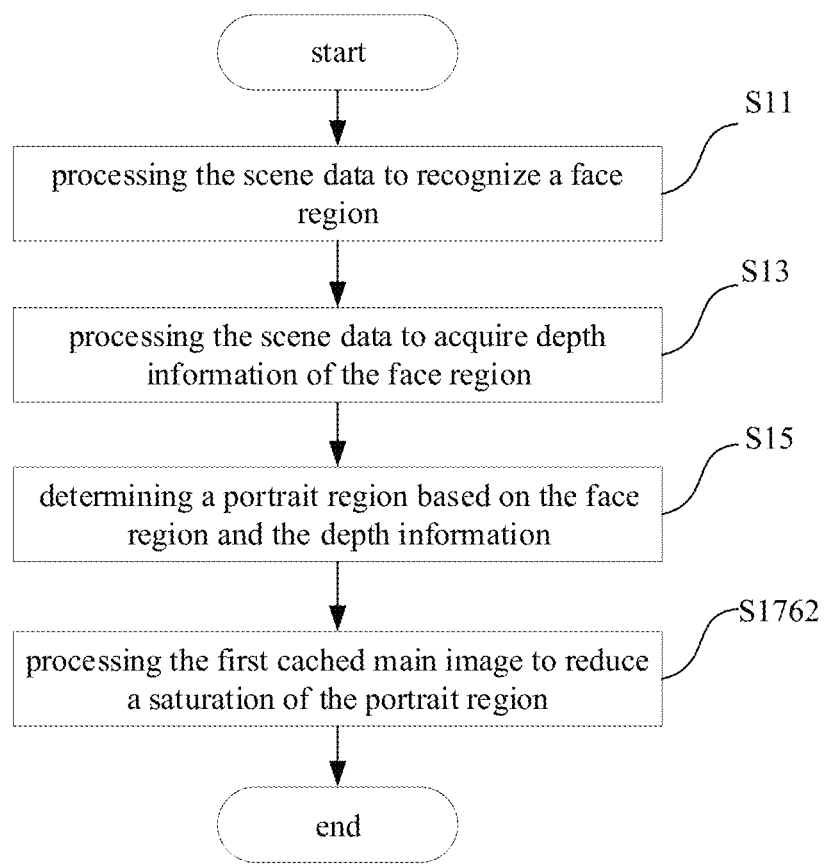
FIG. 40 is a flow chart illustrating a control method according to some embodiments of the present disclosure.

Referring to FIG. 40, in some embodiments, the act in block S17, i.e., controlling the electronic device 100 based on the portrait region, may include an act in the following block.

At block S1762, the first cached main image is processed to reduce a saturation of the portrait region.

Figure 41:
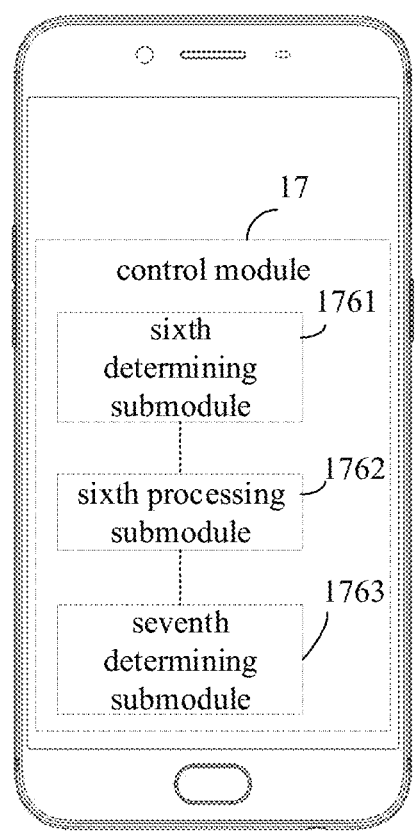
FIG. 41 is a block diagram illustrating a control module according to some embodiments of the present disclosure.

Referring to FIG. 41, in some embodiments, the control module 17 may include a sixth processing submodule 1762. The act in block S1762 may be implemented by the sixth processing submodule 1762.

That is, the sixth processing submodule 1762 is configured to process the first cached main image to reduce a saturation of the portrait region.

Therefore, reducing the saturation may be performed on the more accurate portrait region acquired based on the depth information, which may protect the skin color of the person in the portrait region and prevent the saturation of the entire image from being processed to cause the skin to be yellowish, thereby improving the image visual effect.

Figure 42:
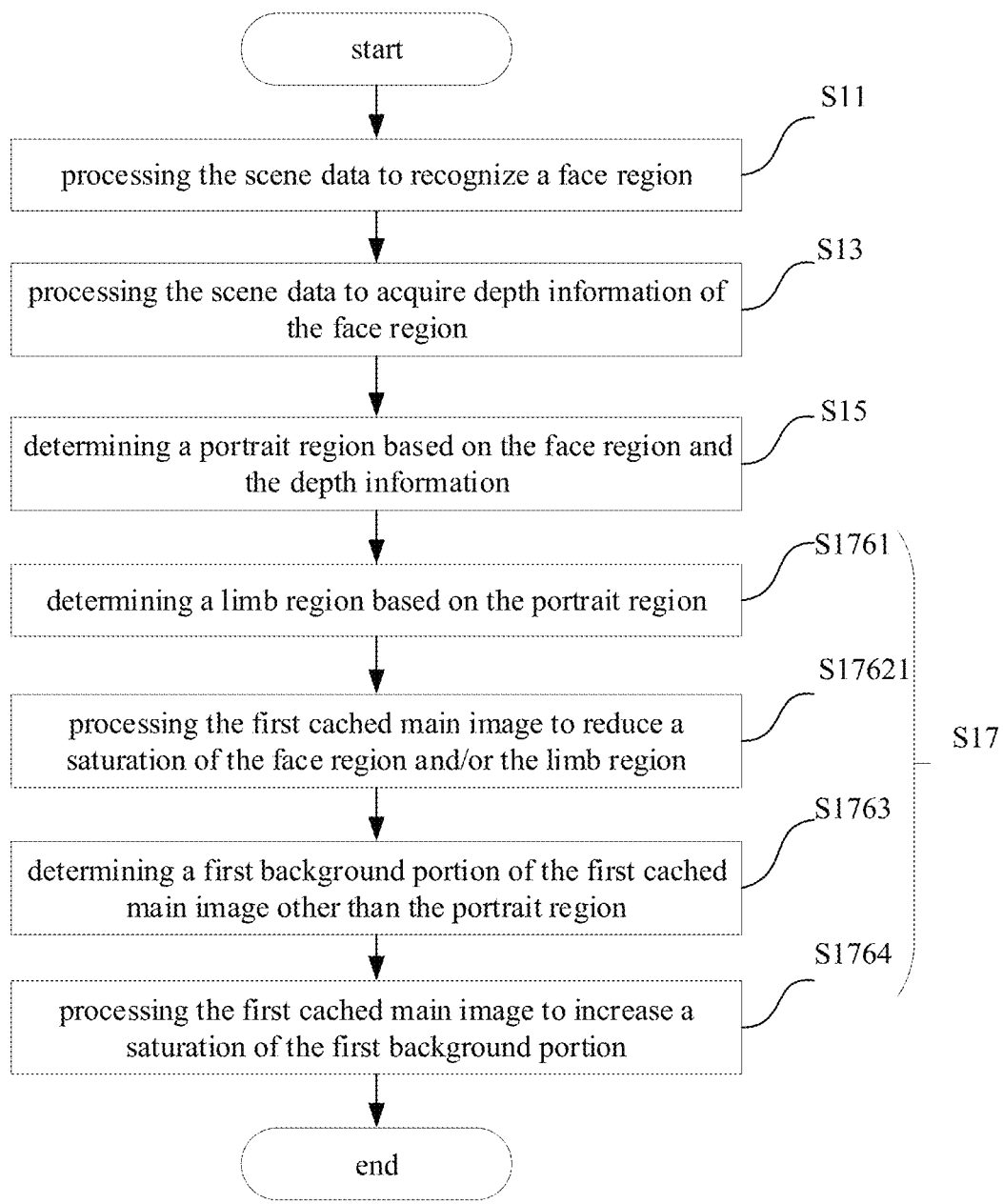
FIG. 42 is a flow chart illustrating a control method according to some embodiments of the present disclosure.

Referring to FIG. 42, in some embodiments, in some embodiments, the act in block S17, i.e., controlling the electronic device 100 based on the portrait region, may further include an act in the following block.

At block S1761, a limb region is determined based on the portrait region.

The act in block S1762 may include an act in the following block.

At block S17621, the first cached main image is processed to reduce a saturation of the face region and/or the limb region.

Referring to FIG. 41 again, in some embodiments, the control module 17 may include a sixth determining submodule 1761. The act in block S1761 may be implemented by the sixth determining submodule 1761. The act in block S17621 may be implemented by the sixth processing submodule 1762.

That is, the sixth determining submodule 1761 is configured to determine a limb region based on the portrait region. The sixth processing submodule 1762 is further configured to: process the first cached main image to reduce a saturation of the face region and/or the limb region.

In some embodiments, the limb region includes a neck, a hand, an arm, a leg and/or a foot. The limb region is similar in color to the face region.

It is to be understood that since the portrait region may also include other limb region, when the limb region is exposed, the saturation processing should be similar to the face region, i.e., the saturation is lowered, so that the skin color of the human body is kept uniform. In detail, the bone distribution of the human body, such as the distribution of the limbs, may be estimated based on the portrait region and the face region, thereby determining the limb region. Due to the uncertainty of the clothing and posture of the photographed person during the capturing, there may be errors in the limb region when the limb region is determined based on the bone distribution. Therefore, the limb region in the portrait may be determined by combining the color of the face region. Thereby, the determined limb region is subjected to the same saturation processing as the face region, realizing skin color protection for the limb region.

Referring to FIG. 42 again, in some embodiments, the act in block S17, i.e., controlling the electronic device 100 based on the portrait region, may further include an act in the following block.

At block S1763, a first background portion of the first cached main image other than the portrait region is determined.

At block S1764, the first cached main image is processed to increase a saturation of the first background portion.

Referring to FIG. 41 again, in some embodiments, the control module 17 may further include a seventh determining submodule 1763. The act in block S1763 may be implemented by the seventh determining submodule 1763. The act in block S1764 may be implemented by the sixth processing submodule 1762.

That is, the seventh determining submodule 1763 is configured to determine a first background portion of the first cached main image other than the portrait region. The sixth processing submodule 1762 is further configured to process the first cached main image to increase a saturation of the first background portion.

In detail, after determining the portrait region, the remaining portion may be used as the first background portion. The first background portion should be understood in a broad sense, that is, all regions except the portrait region, but not the regions which has the depth information larger than the portrait region. It is to be understood that increasing the saturation of the background portion may make the color of the background portion of the image more vivid and bright. Since the saturation of the portrait region is reduced, the color of the portrait region, especially the skin, will be more natural.

Figure 43:
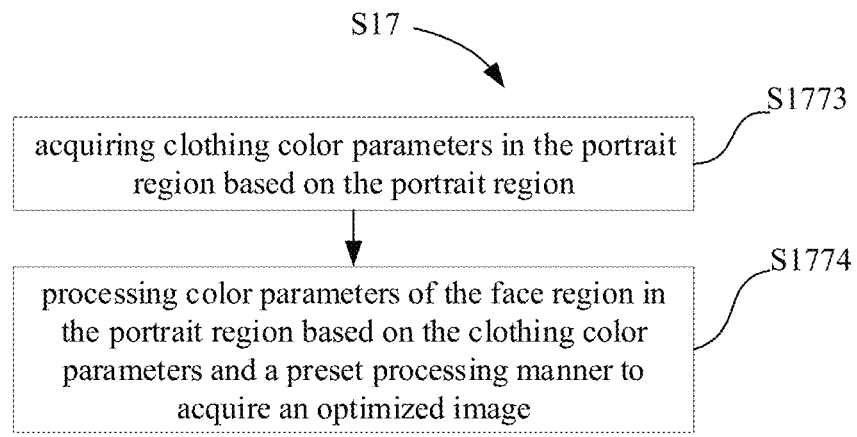
FIG. 43 is a flow chart illustrating a control method according to some embodiments of the present disclosure.

Referring to FIG. 43, in some embodiments, the act in block S17, i.e., controlling the electronic device 100 based on the portrait region, may further include acts in the following blocks.

At block S1773, clothing color parameters in the portrait region are acquired based on the portrait region.

At block S1774, color parameters of the face region in the portrait region are processed based on the clothing color parameters and a preset processing manner to acquire an optimized image.

Figure 44:
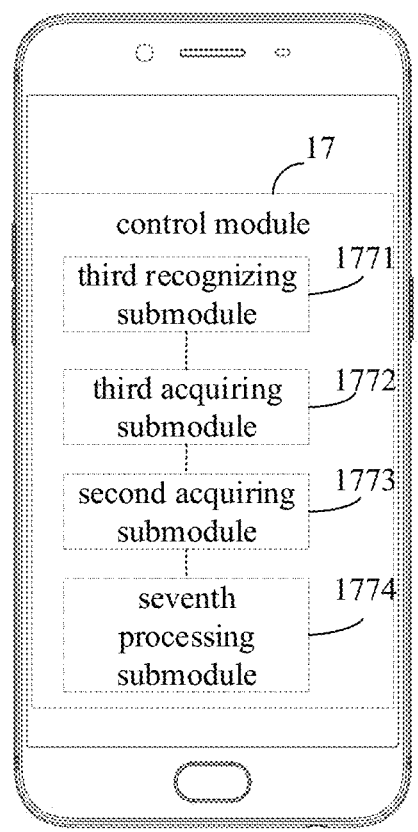
FIG. 44 is a block diagram illustrating a control module according to some embodiments of the present disclosure.
Figure 45:
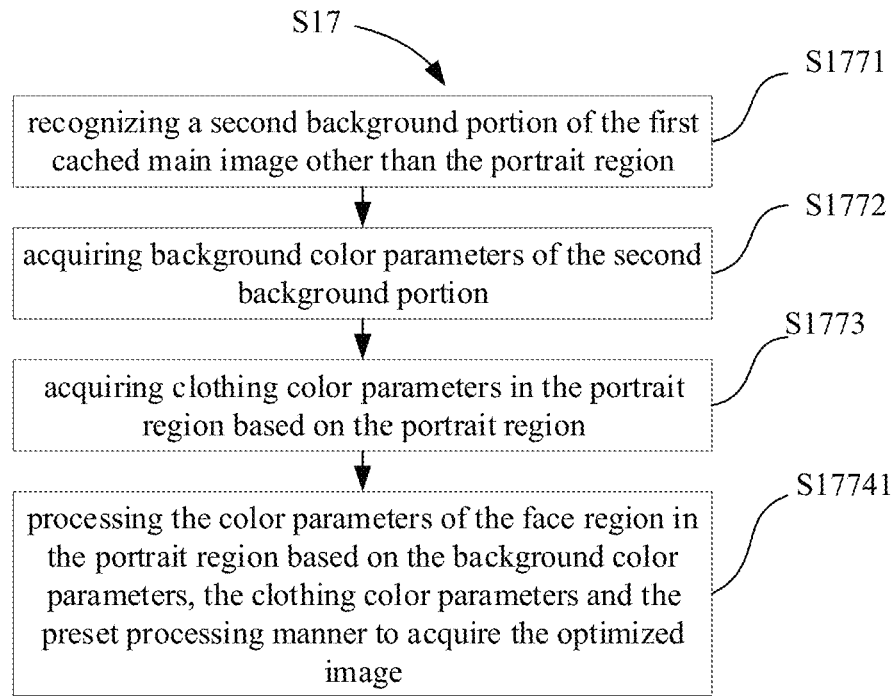
FIG. 45 is a flow chart illustrating a control method according to some embodiments of the present disclosure.

Referring to FIG. 44, in some embodiments, the control module 17 may include a second acquiring submodule 1773 and a seventh processing submodule 1774. The act in block S1773 may be implemented by the second acquiring submodule 1773. The act in block S1774 may be implemented by the seventh processing submodule 1774.

That is, the second acquiring submodule 1773 is configured to acquire clothing color parameters in the portrait region based on the portrait region. The seventh processing submodule 1774 is configured to process color parameters of the face region in the portrait region based on the clothing color parameters and a preset processing manner to acquire an optimized image.

Therefore, after the more accurate portrait region is recognized based on the depth information, the color parameters of the face region are processed based on the clothing color information and the corresponding setting processing manner, so that the color parameter processing and the scene of the face are more matching, and there is no need to adjust the color based on the skin color features, and the effect and the user experience both are better.

Referring to FIG. 43, in some embodiments, the act in block S17, i.e., controlling the electronic device 100 based on the portrait region, may further include acts in the following blocks.

At block S1771, a second background portion of the first cached main image other than the portrait region is recognized.

At block S1772, background color parameters of the second background portion are acquired.

The act in block S1774, i.e., processing the color parameters of the face region in the portrait region based on the clothing color parameters and the preset processing manner to acquire the optimized image, may further include an act in the following block.

At block S17741, the color parameters of the face region in the portrait region are processed based on the background color parameters, the clothing color parameters and the preset processing manner to acquire the optimized image.

Referring to FIG. 44, in some embodiments, the control module 17 may include a third recognizing submodule 1771 and a third acquiring submodule 1772. The act in block S1171 may be implemented by the third recognizing submodule 1771. The act in block S1172 may be implemented by the third acquiring submodule 1772. The act in block S17741 may be implemented by the seventh processing submodule 1774.

That is, the third recognizing submodule 1771 is configured to recognize a second background portion of the first cached main image other than the portrait region. The third acquiring submodule 1772 is configured to acquire background color parameters of the second background portion. The seventh processing submodule 17741 is further configured to process the color parameters of the face region in the portrait region based on the background color parameters, the clothing color parameters and the preset processing manner to acquire the optimized image.

In detail, after determining the portrait region, the remaining portion may be used as the second background portion. The second background portion should be understood in a broad sense, that is, all regions except the portrait region but not the regions which has the depth information larger than the portrait region. It is to be understood that processing the portrait region should not only take into account the color parameters of the clothing, but also the color parameters of the capturing scene or the background. For example, when the background is mainly blue sky or blue ocean, the saturation of the skin color of the face region may be appropriately increased based on the color parameters, and the brightness is increased, thereby obtaining an optimized image.

In some embodiments, the preset processing manner may include one or more of increasing a saturation of the face region, reducing the saturation of the face region, and increasing a brightness of the face region.

It is to be understood that each user's visual perception of the image is different. Therefore, the electronic device 100 may preset the processing modes of some scenes before leaving the factory. The user may also add other modes based on the capturing requirements later.

Figure 46:
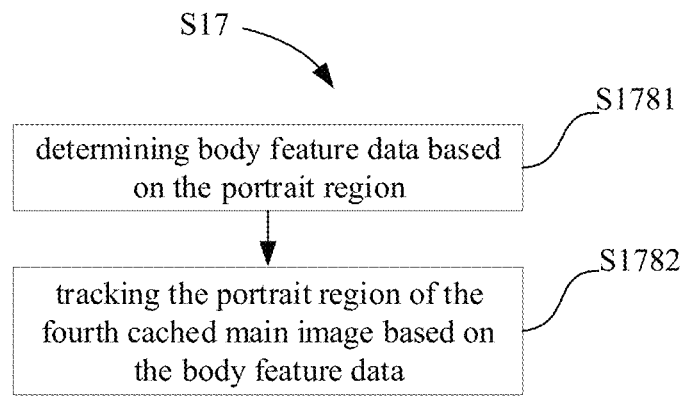
FIG. 46 is a flow chart illustrating a control method according to some embodiments of the present disclosure.

Referring to FIG. 46, in some embodiments, the scene data includes a fourth cached main image. The act in block S17, i.e., controlling the electronic device 100 based on the portrait region, may include acts in the following blocks.

At block S1781, body feature data is determined based on the portrait region.

At block S1782, the portrait region of the fourth cached main image is tracked based on the body feature data.

Figure 47:
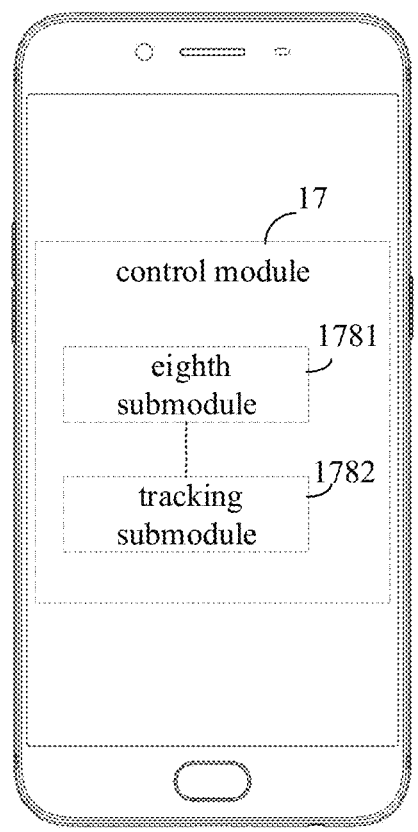
FIG. 47 is a block diagram illustrating a control module according to some embodiments of the present disclosure.

Referring to FIG. 47, in some embodiments, the control module 17 may include an eighth submodule 1781 and a tracking submodule 1782. The act in block S1781 may be implemented by the eighth submodule 1781. The act in block S1782 may be implemented by the tracking submodule 1782.

That is, the eighth submodule 1781 is configured to determine body feature data based on the portrait region. The tracking submodule 1782 is configured to track the portrait region of the fourth cached main image based on the body feature data.

In detail, the first cached main image is the current frame image, and the fourth cached main image is the next frame image.

It is to be understood that the conventional human body tracking method is based on RGB color images. It is easily affected by environmental factors such as illumination, shadow, and object occlusion, and the recognition rate of the portrait and the robustness of the human body tracking are greatly reduced. Therefore, recognizing the portrait based on the depth information and tracking the human body based on the depth information and the portrait region may improve the robustness of the human body tracking.

Figure 48:
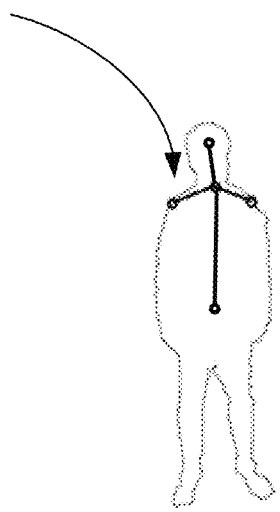
FIG. 48 is a schematic diagram illustrating states of a control method according to some embodiments of the present disclosure.

Referring to FIG. 48, in some embodiments, the body feature data may include shoulder and neck position data, head position data, and body centroid data.

In detail, after the portrait region is determined, body feature data such as shoulder position data, neck position data, head position data, and the like may be determined based on the human body ratio, the skeleton point, the depth information, and the like. After determining the human body features such as the neck, the shoulder and the head in the first cache main image, the body tracking algorithm based on the Kalman filter may be employed to estimate the speed, acceleration and other information of the human body and the position of the human body in the fourth cached main image. Therefore, real-time tracking of the human body may be achieved.

Figure 49:
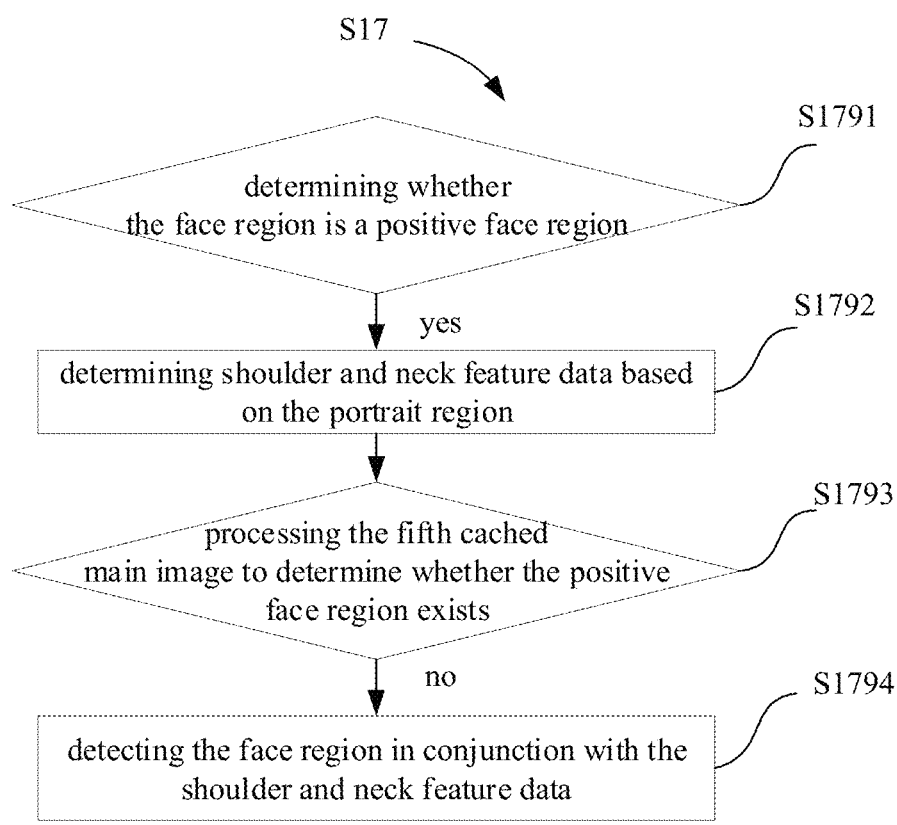
FIG. 49 is a flow chart illustrating a control method according to some embodiments of the present disclosure.

Referring to FIG. 49, in some embodiments, the scene data includes a fifth cached main image. The act in block S17, i.e., controlling the electronic device 100 based on the portrait region, may include acts in the following blocks.

At block S1791, it is determined whether the face region is a positive face region.

At block S1792, shoulder and neck feature data are determined based on the portrait region when the face region is the positive face region.

At block S1793, the fifth cached main image is processed to determine whether the positive face region exists.

At block S1794, the face region is detected in conjunction with the shoulder and neck feature data when the positive face region is absent.

Figure 50:
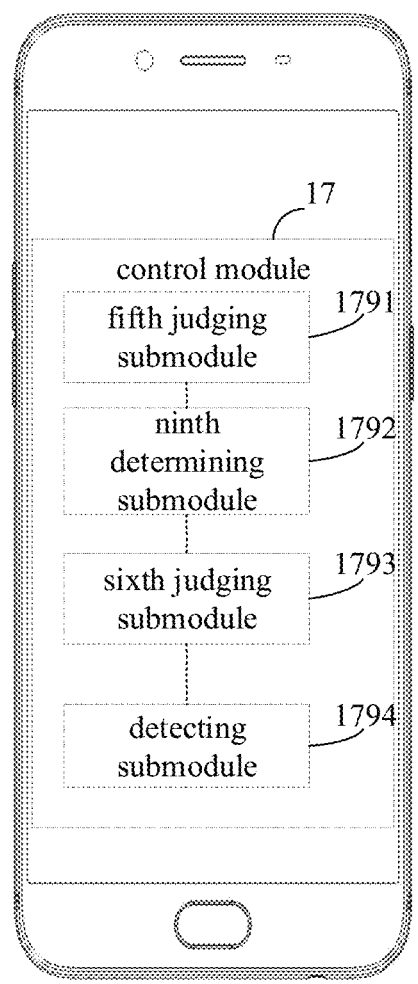
FIG. 50 is a block diagram illustrating a control module according to some embodiments of the present disclosure.

Referring to FIG. 50, in some embodiments, the control module 17 may include a fifth judging submodule 1791, a ninth determining submodule 1792, a sixth judging submodule 1793, and a detecting submodule 1794. The act in block S1791 may be implemented by the fifth judging submodule 1791. The act in block S1792 may be implemented by the ninth determining submodule 1792. The act in block S1793 may be implemented by the sixth judging submodule 1793. The act in block S1794 may be implemented by the detecting submodule 1794.

That is, the fifth judging submodule 1791 is configured to determine whether the face region is a positive face region. The ninth determining submodule 1792 is configured to determine shoulder and neck feature data based on the portrait region when the face region is the positive face region. The sixth judging submodule 1793 is configured to process the fifth cached main image to determine whether the positive face region exists. The detecting submodule 1794 is configured to detect the face region in conjunction with the shoulder and neck feature data when the positive face region is absent.

In detail, the first cached main image is the current frame image, and the fifth cached main image is the next frame image.

It is to be understood that in the daily photography process, especially when capturing a portrait, the face is often a region of interest in the image, so it needs to be detected and applied, such as keeping the face focused, or raising the face exposure to increase brightness, etc. Generally, the face region is directed toward the imaging apparatus 20. The face detection is performed based face features, for example, feature points and color information. When the face waggles, the face is no longer facing the imaging apparatus 20, and the feature information for detecting the face region may be lost, and the face region cannot be detected. At this time, the relevant parameters or actions for adjusting the face region cannot be continued. Therefore, after the portrait region is recognized based on the depth information and the shoulder and neck feature data is determined based on the portrait region, when the face is deflected and the face feature cannot be acquired such that the face recognition fails, the deflected contour, and the shoulder and neck feature data may be used to reverse the face region. For example, when the face rotates, the shoulder and neck generally rotate slightly, and the structure of the shoulder and neck or the shoulder and neck feature data also may change slightly. The predetermined threshold of the change of the shoulder and neck feature data may be set. When the change is at the predetermined threshold, the face region may be determined accordingly, thereby continuously recognizing the face region when the face rotates. Therefore, in the case where the face is deflected, the face region may still be detected to track the face region and improve the user experience.

Figure 51:
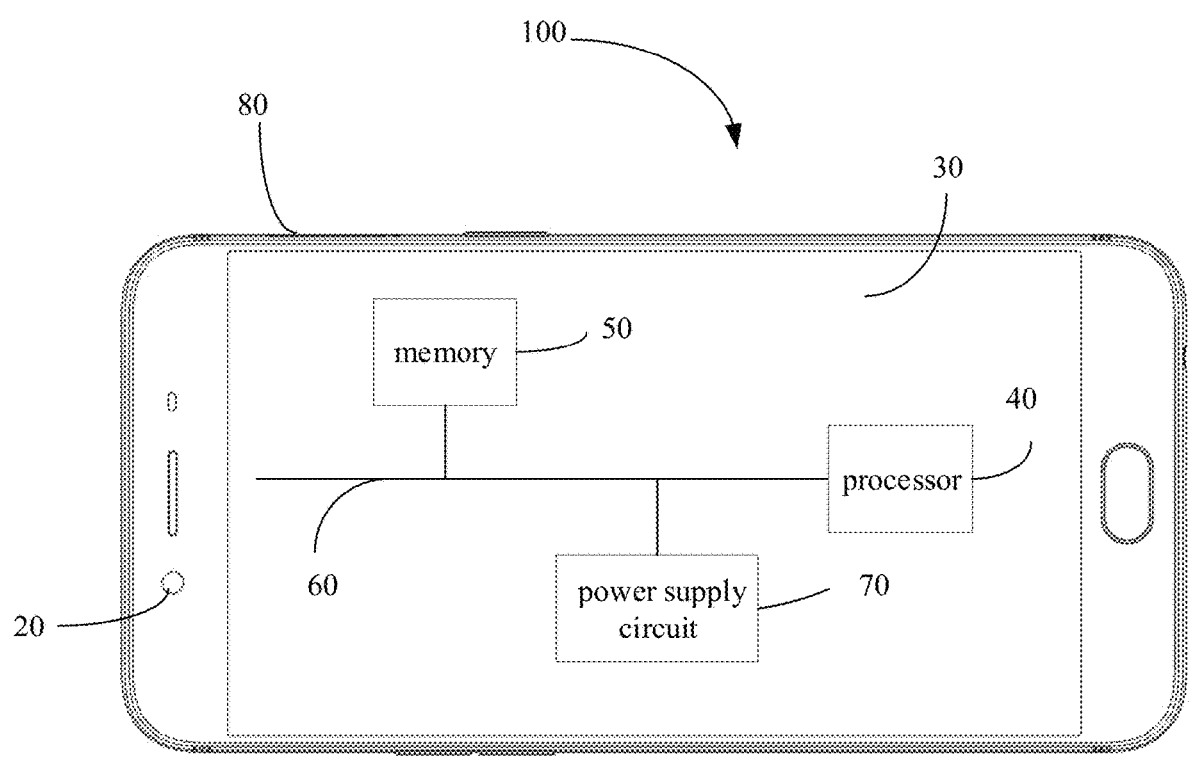
FIG. 51 is a block diagram illustrating an electronic device according to some embodiments of the present disclosure.

Referring to FIG. 51, an electronic device 100 of the embodiment of the present disclosure may include a processor 40, a memory 50, a circuit board 60, and a power supply circuit 70 and a housing 80. The circuit board 60 is disposed inside a space enclosed by the housing 80. The processor 40 and the memory 50 are disposed on the circuit board. The power supply circuit 70 is configured to supply power to each circuit or apparatus of the electronic device 100. The memory 50 is configured to store executable program codes. The processor 40 is configured to read the executable program codes stored in the memory to execute a program corresponding to the executable program codes for performing the depth-based control method. The processor 400 is further configured to perform the following acts: processing the scene data to recognize a face region; processing the scene data to acquire depth information of the face region; determining a portrait region based on the face region and the depth information; and controlling the electronic device based on the portrait region.

The processor 400 is further configured to perform the following acts: recognizing a face region and/or a limb region based on the portrait region; and processing the face region and/or the limb region based on a preset processing manner to acquire a body beautification image.

The processor 400 is further configured to perform the following acts: determining whether the portrait region is underexposed; performing a separate photometry on the portrait region to acquire correction photometric data when the portrait region is underexposed; and controlling the imaging apparatus to collect a second cached main image based on the correction photometric data, the scene data comprising the second cached main image.

The processor 400 is further configured to perform the following acts: determining body feature data based on the portrait region; and tracking the portrait region of the fourth cached main image based on the body feature data.

It should be noted that the foregoing description of the control method and the control apparatus 10 is also applicable to the electronic device 1000 of the embodiment of the present disclosure, and details are not described herein again.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance, or imply the number of technical features indicated. Furthermore, the feature defined with "first" and "second" may comprise one or more this feature distinctly or implicitly. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling an electronic device based on scene data collected by an imaging apparatus of the electronic device, the scene data comprising a first cached main image and a depth image corresponding to the first cached main image, the method comprising:
   processing the scene data to recognize a face region;
   processing the scene data to acquire depth information of the face region;
   determining a portrait region based on the face region and the depth information; and
   controlling the electronic device based on the portrait region, comprising:
     determining whether the portrait region is underexposed;
     performing a separate photometry on the portrait region to acquire correction photometric data when the portrait region is underexposed; and controlling the imaging apparatus to collect a second cached main image based on the correction photometric data, wherein the scene data further comprises the second cached main image.

2. The method of claim 1, wherein determining the portrait region based on the face region and the depth information comprises:
determining an estimated portrait region based on the face region;
determining a depth range of the portrait region based on the depth information of the face region;
determining, based on the depth range of the portrait region, a calculated portrait region connected to the face region and falling within the depth range;
determining whether the calculated portrait region matches the estimated portrait region; and
determining the calculated portrait region as the portrait region when the calculated portrait region matches the estimated portrait region.

3. The method of claim 2, further comprising:
processing a portrait region of the first cached main image to acquire a color edge map;
processing depth information corresponding to the portrait region of the first cached main image to acquire a depth edge map; and
correcting the portrait region by using the color edge map and the depth edge map.

4. The method of claim 1, wherein controlling the electronic device based on the portrait region comprises:
recognizing a human limb based on the portrait region to acquire a limb recognition image.

5. The method of claim 4, wherein the electronic device comprises a database storing a library of limb templates, and a displayer, and recognizing the human limb based on the portrait region to acquire the limb recognition image comprises:
searching a limb template matching the portrait region in the library of limb templates based on the portrait region;
determining a limb position of the portrait region based on the limb template to acquire the limb recognition image;
transmitting the limb recognition image to the displayer; and
controlling the displayer to display the limb recognition image.

6. The method of claim 1, wherein controlling the electronic device based on the portrait region comprises:
recognizing at least one of a first face region or a limb region based on the portrait region; and
processing at least one of the first face region or the limb region based on a preset processing manner to acquire a body beautification image.

7. The method of claim 1, wherein determining the portrait region based on the face region and the depth information comprises:
setting a preset depth range based on the depth information;
determining, based on the preset depth range, an initial portrait region connected to the face region and falling within the preset depth range;
dividing the initial portrait region into a plurality of sub-regions;
acquiring gray values of respective pixels of each of the sub-regions;
selecting one pixel from the pixels of each of the sub-regions as an origin;
determining whether a difference between the gray value of each of the pixels other than the origin and the gray value of the origin in each of the sub-regions is greater than a predetermined threshold; and
merging the pixel that differ from the gray value of the origin by less than the predetermined threshold into the portrait region.

8. The method of claim 6, wherein processing at least one of the face region or the limb region based on the preset processing manner to acquire the body beautification image comprises:
processing the first cached main image to determine whether the portrait region has an occlusion; and
recognizing at least one of the face region or the limb region based on the portrait region when the obstruction is absent.

9. The method of claim 8, wherein the database stores a library of body templates, and recognizing at least one of the face region or the limb region based on the portrait region comprises:
processing the portrait region to obtain a skeleton image;
searching a body template matching the skeleton image in the library of body templates; and
determining at least one of the face region or the limb region based on the body template.

10. The method of claim 1, wherein controlling the electronic device based on the portrait region comprises:
processing the portrait region to merge a region that is similar in color to the face region in the portrait region to a skin region.

11. The method of claim 10, wherein processing the portrait region to merge the region that is similar in color to the face region in the portrait region to the skin region comprises:
processing the portrait region to acquire color data of respective color pixel points of the portrait region;
determining whether the color data falls within a preset range; and
merging a pixel point in which the color data falls within the preset range into the skin region.

12. The method of claim 1, further comprising:
controlling the imaging apparatus to perform a global photometry to acquire global photometric data; and
controlling the imaging apparatus to acquire the first cached main image based on the global photometric data,
wherein controlling the imaging apparatus to perform the global photometry to acquire the global photometric data comprises:
dividing a third cached main image output by the imaging apparatus into a plurality of first analysis regions, the scene data comprising the third cached main image; and
calculating brightness information of each of the first analysis regions to acquire the global photometric data.

13. The method of claim 1, wherein determining whether the portrait region is underexposed comprises:
determining whether a ratio of a brightness of the portrait region to a brightness of the first cache main image is less than a predetermined ratio; and
determining that the portrait region is underexposed when the ratio is less than the predetermined ratio.

14. The method of claim 1, wherein performing the separate photometry on the portrait region to acquire the correction photometric data when the portrait region is underexposed comprises:

dividing the portrait region into a plurality of second analysis regions; and calculating brightness information of each of the second analysis regions to acquire the correction photometric data.

15. The method of claim 1, wherein controlling the electronic device based on the portrait region comprises:

performing separately a white balance on the portrait region to acquire a portrait correction image.

16. The method of claim 15, wherein controlling the electronic device based on the portrait region further comprises:

performing a global automatic white balance on the first cached main image to acquire a global correction image; and wherein performing separately the white balance on the portrait region to acquire the portrait correction image comprises:

processing the global correction image to perform separately the white balance on the portrait region to acquire the portrait correction image.

17. The method of claim 1, wherein controlling the electronic device based on the portrait region comprises:

processing the first cached main image to reduce a saturation of the portrait region, wherein controlling the electronic device based on the portrait region further comprises:

determining a limb region based on the portrait region; and wherein processing the first cached main image to reduce the saturation of the portrait region comprises:

processing the first cached main image to reduce a saturation of at least one of the face region or the limb region.

18. The method of claim 17, wherein controlling the electronic device based on the portrait region further comprises:

determining a first background portion of the first cached main image other than the portrait region; and processing the first cached main image to increase a saturation of the first background portion.

19. An electronic device, comprising:

an imaging apparatus;

a displayer;

a memory configured to store executable program codes; and a processor configured to read the executable program codes stored in the memory to execute a program corresponding to the executable program codes for performing a method for controlling the electronic device based on scene data collected by the imaging apparatus, the scene data comprising a first cached main image and a depth image corresponding to the first cached main image, the method comprising:

processing the scene data to recognize a face region;

processing the scene data to acquire depth information of the face region;

determining a portrait region based on the face region and the depth information; and controlling the electronic device based on the portrait region, comprising:

determining whether the portrait region is underexposed;

performing a separate photometry on the portrait region to acquire correction photometric data when the portrait region is underexposed; and controlling the imaging apparatus to collect a second cached main image based on the correction photometric data, wherein the scene data further comprises the second cached main image.

* * * * *